United States Patent [19]
Fujiwara et al.

[11] Patent Number: 5,746,282
[45] Date of Patent: May 5, 1998

[54] POWER-ASSISTED CART

[75] Inventors: Shigeki Fujiwara; Hideki Yamashita, both of Osaka; Hiroshi Maeda, Daito, all of Japan

[73] Assignee: Matsushita Electric Works, Ltd., Osaka, Japan

[21] Appl. No.: 629,945

[22] Filed: Apr. 12, 1996

[30] Foreign Application Priority Data

Apr. 14, 1995 [JP] Japan ................................ 7-089847

[51] Int. Cl.⁶ .................................................. B62D 6/00
[52] U.S. Cl. ................................... 180/6.2; 180/6.5
[58] Field of Search ................................. 180/6.2, 6.28, 180/6.44, 6.48, 6.5, 6.26, 6.24, 7.1, 19.1, 19.2, 19.3, 3.5, 170

[56] References Cited

U.S. PATENT DOCUMENTS

| | | | |
|---|---|---|---|
| 3,814,199 | 6/1974 | Jones | 180/6.5 |
| 3,823,791 | 7/1974 | Sheler | 180/6.2 |
| 3,893,530 | 7/1975 | Gordon | 180/6.5 |

FOREIGN PATENT DOCUMENTS 63-215459A   9/1988   Japan.

Primary Examiner—Stephen Avila
Attorney, Agent, or Firm—Kenyon & Kenyon

[57] ABSTRACT

A power-assisted cart includes a wheeled platform for supporting a load thereon; driving wheels mounted on the wheeled platform for, when driven, moving the wheeled platform; a drive unit for driving the driving wheels; an operating unit which may be in the form of a handle mounted on the wheeled platform for receiving an external force applied thereto when the cart is desired to be moved; a force detector for detecting a magnitude and direction of the external force applied to the operating unit; and a control for generating to the drive unit an output substantially proportional to the external force detected by the force detector.

22 Claims, 39 Drawing Sheets

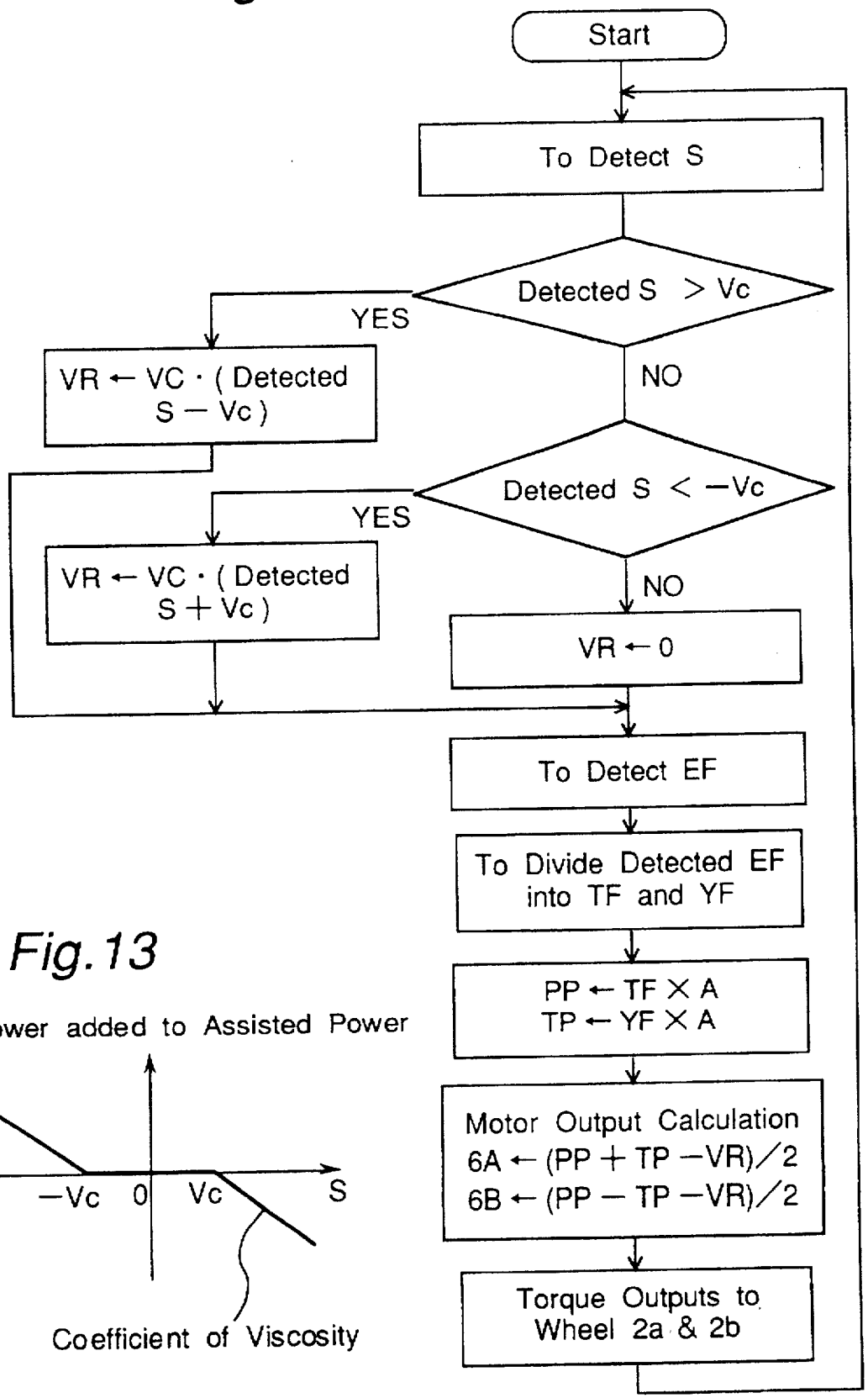

Power Added to Assisted Power vs Speed

1

POWER-ASSISTED CART

BACKGROUND OF THE INVENTION

1. (Field of the Invention)

The present invention generally relates to a wheeled vehicle such as, for example, a cart and, more particularly, to an electrically power-assisted cart.

2. (Description of the Prior Art)

In transporting a load over a relatively short distance from one place to another in many facilities where self-propelled vehicles are not utilizable for some reason, a wheeled vehicle such as a cart is largely employed. Though convenient and economical under those circumstances, the wheeled cart has detrimental problems. The higher the load to be carried and/or the steeper the slope, the higher the manpower required and/or the less the mobility.

The use of power-assisted carts is becoming more widespread as users seek to avoid the drawbacks experienced hitherto with the manually wheeled carts. One known power-assisted cart has a drive unit mounted thereon in combination with a switch for controlling the drive unit. This type of power-assisted cart has been found to be difficult to maneuver accurately and precisely.

Accordingly, the Japanese Laid-open Patent Publication No. 63-215459, published Sep. 7, 1988, discloses a sophisticated, electrically power-assisted cart comprising a generally rectangular platform having a handle and also having front left and right wheels and rear left and right wheels. The front left and right wheels are drive wheels that are drivingly coupled with a first reversible drive motor while the rear left and right wheels are steering wheels that are operatively linked with a second reversible drive motor. The first and second drive motors are controllable by a control unit in response to a force applied to the handle. The handle is operatively associated with a force sensor for detecting application to the handle of a force for moving the cart either forward or rearward.

This prior art system claims that the power-assisted cart can be driven in response to application of the force to the handle at a velocity sufficient to counterbalance the magnitude of the applied force to thereby permit the operator to feel as if no force were applied to the handle, in a direction conforming to the direction in which the force is applied to the handle. In this connection, the publication in question describes:

"This signal a (outputted from the force sensor) is representative of a vector Fs of a force on the coordinates fixed to the force sensor. The signal a outputted from the force sensor 4 is supplied to the control unit 7. In the control unit 7, it is inputted to a coordinate converter 71. In the coordinate converter 71, the signal a is subjected to coordinate conversion and is expressed in terms of a vector Fo of a force on the coordinates 21 fixed to the platform 2. Then, based on the force vector Fo, a method of calculating the direction and velocity of movement of the cart will be described. A diagram showing the relationship between the coordinates 21 fixed to the platform 2 and the force vector Fo is shown in FIG. 4. Reference numeral 10 represents the force vector Fo, reference numeral 21 represents the coordinates fixed to the platform 2, reference numeral 11 represents a projected vector Fo' on an Xo–Yo plane of the vector Fo. Since the cart moves only on a plane containing the Xo- and Yo-axes, it is assumed that the direction of movement of the cart is expressed by an angle θ between the vector Fo' and the Xo-axis and the velocity of movement of the cart is expressed by the value m on the Xo-ordinate axis of the vector Fo'. A signal b1 indicative of the angle θ representative of the direction of movement of the cart is inputted to a stabilizing compensator 72. The stabilizing compensator 72 calculates and outputs to a motor 61 an input signal c1 necessary for the signal indicative of the angle θ representative of the direction of movement of the cart obtained from the force sensor 4 to become zero. A signal b2 indicative of the value m representative to the velocity of movement of the cart is inputted to a stabilizing compensator 73. The stabilizing compensator 73 calculates and outputs to a drive motor 62 an input signal c2 necessary for the signal indicative of the value m representive of the velocity of movement of the cart obtained from the force sensor 4 to become zero."

Notwithstanding the concept of the invention disclosed in the above mentioned publication, neither specific means nor specific method to accomplish the objective is clear.

In any event, it is generally recognized that when a man manually applies a force to a load, he or she can feel or gain a response from the load. The larger the load is, the higher the response he feels. Conversely, the smaller the load is, the lower the response he can have. In the case of the wheeled cart carrying the load, the operator may control or maneuver the cart in reference to the response he or she has had from the cart.

However, in the prior art power-assisted cart such as disclosed in the above mentioned publication which is controlled to move at a velocity appropriate to the magnitude of the applied force, the cart is driven at a velocity effective to cause the applied force to be substantially nulled, and this means that the operator pushing the power-assisted cart would feel so little a response from the loaded cart that a precise and accurate control of the loaded cart may be difficult to achieve.

SUMMARY OF THE INVENTION

In view of the foregoing, the present invention has been devised to provide an improved power-assisted cart capable of exhibiting a favorable maneuverability in which a delicate control is possible to secure a high safety factor.

To this end, the present invention provides a power-assisted cart which comprises a wheeled platform for supporting a load thereon; a driving wheel means mounted on the wheeled platform for, when driven, moving the wheeled platform; a drive unit for driving the driving wheel means; an operating unit which may be in the form of a handle mounted on the wheeled platform for receiving an external force applied thereto when the cart is desired to be moved; a force detecting means for detecting a magnitude and direction of the external force applied to the operating unit; and a control means for generating to the drive unit an output substantially proportional to the external force detected by the force detecting means.

Preferably, the wheeled platform is of a generally rectangular configuration having front and rear end and may include front and rear casters mounted at the front and rear end of the wheeled platform at respective locations aligned with the longitudinal axis of the wheeled platform. In this case, the driving wheel means may include two driving wheels mounted at respective sides of the wheeled platform and may be independently controllable by the control means.

The control means may preferably be of a design capable of causing the drive unit to exert an assisted power corrected in dependence on a rate of change of the applied external force or capable of neglecting the applied external force when the latter is of an extremely small value.

Use may be made of a speed detecting means for detecting a travelling speed of the power-assisted cart. Where the speed detecting means is employed, the control means may be of a type capable of causing the drive unit to exert an assisted power corrected in dependence on the detected travelling speed. In such case, the assisted power may be disabled when the detected travelling speed exceeds a predetermined value; the amplification factor based on the assisted power may be decreased when the detected travelling speed exceeds a predetermined value; correction of the assisted power based on the travelling speed may be carried out by adding a viscosity proportional to the travelling speed to the assisted power which has been calculated in reference to the applied external force; correction may be made by adding a rolling resistance which increases with increase of the travelling speed; or the assisted power may be corrected by adding the static frictional resistance when the detected travelling speed is of a value lower than an extremely small value.

Use may also be made of an inclination detecting means so that, in the event that the inclination detecting means detects that a ground surface on which the cart is running is a down slope, correction can be made based on the travelling speed that is detected by the speed detecting means.

In the case where the driving wheels are of a kind that can be driven independently from each other and the assisted power proportional to the applied external force applied is applied to each of the driving wheels, use may be made of the speed detecting means for each of the driving wheels. In such case, the control means may be of a type capable of effecting to each of the driving wheels correction of the assisted power based on the detected travelling speed. Specifically, when the difference in speed between the driving wheels is small as compared with the magnitude of the applied external force, the difference between the assisted powers applied respectively to the driving wheels may be increased, but when the difference in speed between the driving wheels is large as compared with the magnitude of the applied external force, the difference between the assisted powers applied respectively to the driving wheels may be decreased.

The power assisted cart of the present invention may preferably include a load detecting means. The load detecting means may be a weighing device for outputting a signal indicative of the weight of the load placed on the wheeled platform, or of a detector for detecting the presence or absence of the load on the wheeled platform. Also, by determining the frictional resistance based on the weight of the load, correction may be made so as to counteract the frictional resistance.

Considering that the frictional force which constitutes a resistance to running of the cart varies with the weight of the load on the cart, correction to counterbalance the frictional resistance may be carried out by determining the frictional resistance in dependence on the weight of the load on the cart. By so doing, a change in maneuverability resulting from the frictional resistance can advantageously be lessened.

In addition, where an inclination detecting means for detecting the angle of inclination of the cart may be used so that the assisted power can be corrected in dependence on the detected angle of inclination, a favorable maneuverability can be obtained regardless of inclination of the slope.

A clutch may also be interposed between each driving wheel and a drive source for driving such driving wheel for disengaging the respective driving wheel from the associated drive source when no external force is applied.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 13 is a diagram showing how the amplification factor should be increased in reference to the travelling speed according to a second modification of the second embodiment of the present invention;

FIG. 14 is a diagram showing a flow of control executed in the power-assisted cart according to the second modification of the second embodiment of the present invention;

DETAILED DESCRIPTION OF THE EMBODIMENTS

First Preferred Embodiment (FIGS. 1 to 7)

Figure 2A:
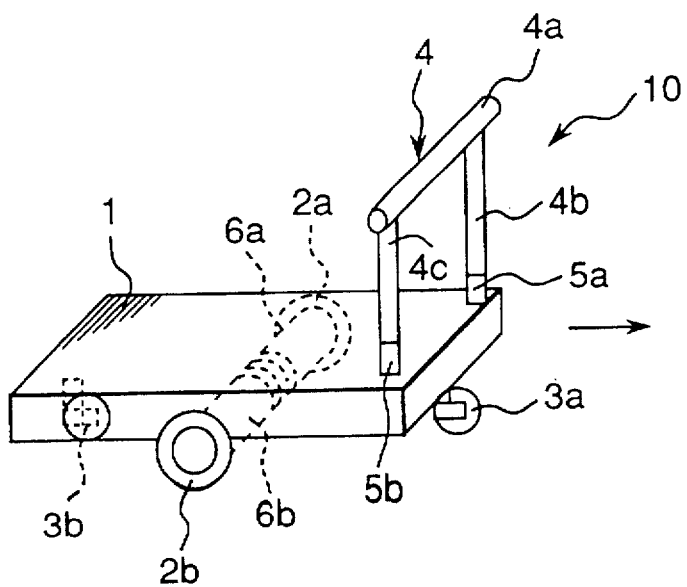
FIG. 2A is a schematic perspective view of the power-assisted cart according to the first embodiment of the present invention.
Figure 2B:
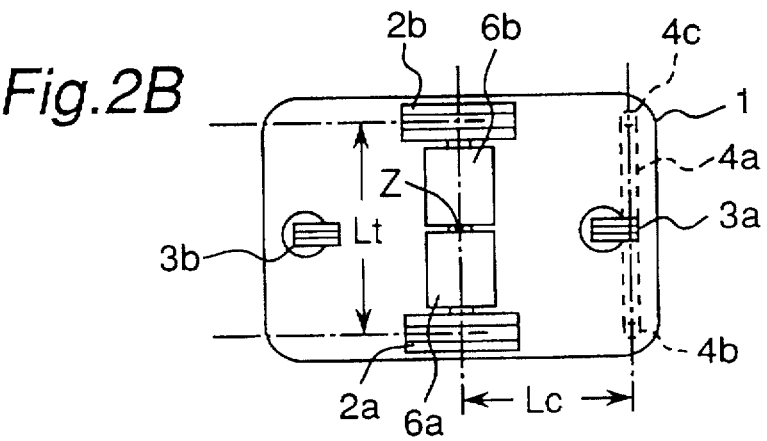
FIG. 2B is a schematic bottom plan view of the power-assisted cart shown in FIG. 2A.
Figure 3:
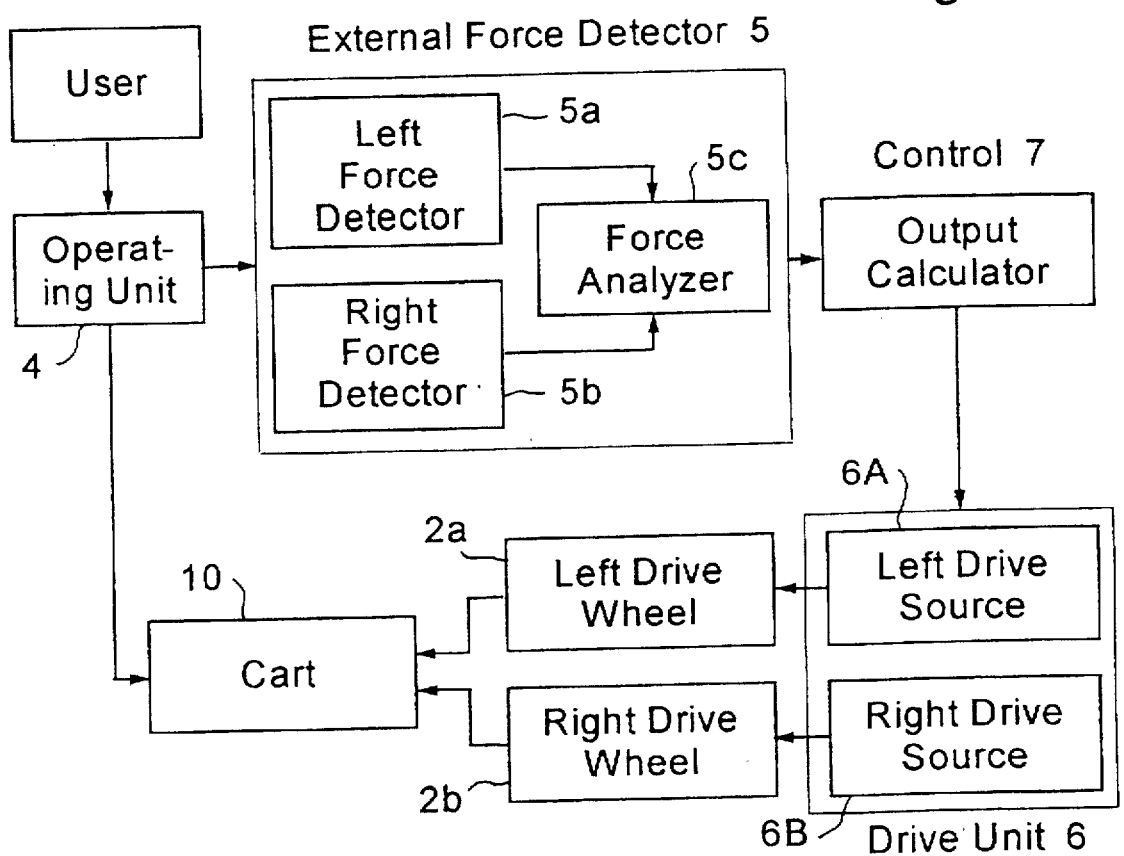
FIG. 3 is a block diagram of a drive system employed in the power-assisted cart according to the first embodiment of the present invention.

Referring first to FIGS. 2A and 2B and FIG. 3, there is shown a power-assisted cart 10 in accordance with a first embodiment of the present invention. The power-assisted cart comprises a generally rectangular wheeled platform 1 for the support thereon of a load such as, for example, cargo, which may be made of hard material such as metal or synthetic resin. The wheeled platform 1 has first (left) and second (right) driving wheels 2a and 2b rotatably secured to respective sides of the platform 1 in coaxial relation to each other and front and rear casters 3a and 3b pivoted to front and rear ends of the platform 1 and also has a handle 4 including a transverse handle bar 4a and generally upright side legs 4b and 4c. The power-assisted cart also comprises a drive unit 6 including left and right drive sources 6A and 6B which may comprise respective electrical drive motors 6a and 6b for independently driving the left and right driving wheels 2a and 2b, a force detecting device 5 including left and right force sensors 5a and 5b built in the side legs 4b and 4c, respectively, and a control device 7.

The drive sources 6A and 6B are fixed to the undersurface of the platform 1 in line with each other and are drivingly coupled with the left and right driving wheels 2a and 2b through an associated gear train (not shown), and an associated brake (not shown). The drive unit 6 including those drive sources 6A and 6B is controlled by the control device 7 in a manner as will be described later.

The force detecting device 5 is operable to detect both the direction and the magnitude of a force applied to the handle 4 to determine what direction an operator of the power-assisted cart 10 intends to move the cart 10 and with what quantity of a thrust. While the force detecting device 5 may comprise a single vector sensor, the illustrated embodiment employs two force sensors, that is, the left and right force sensors 5a and 5b built in the respective right and left side legs 4b and 4c for detecting respective components of the applied force which have been transmitted thereto through the associated side legs 4b and 4c, in combination with a force analyzer 5c for processing respective outputs from the right and second sensors 5a and 5b to provide a vector signal indicative of the direction and the magnitude of the applied force. In any event, the details of the force detecting device 5 will be described later.

While the power-assisted cart 10 is so constructed as hereinabove described, it will readily be understood that the left and right driving wheels 2a and 2b concurrently serve as steering wheels since if the rotational speed of one of the left and right driving wheels 2a and 2b differs from that of the other of the left and right driving wheels 2a and 2b, the power-assisted cart 10 will turn either leftwards or rightwards, rather than travelling straightforward. In the illustrated embodiment, if one of the driving wheels 2a and 2b is held still while only the other of the driving wheels 2a and 2b is allowed to rotate, the power-assisted cart 10 can turn at a turning circle having the center of radius aligned with a point intermediate between the driving wheels 2a and 2b and, therefore, a power-assisted cart 10 compact in size, but capable of making sharp turns in a limited space can be obtained.

An output torque of each of the driving wheels 2a and 2b is controlled by the control device 7 to which the output from the force detecting device 5 is applied. This control device 7 has a power arithmetic unit for calculating a power substantially proportional to the force applied to the handle 4. The sequence of operation of this control device 7 is shown in FIG. 1, reference to which will now be made.

Figure 1:
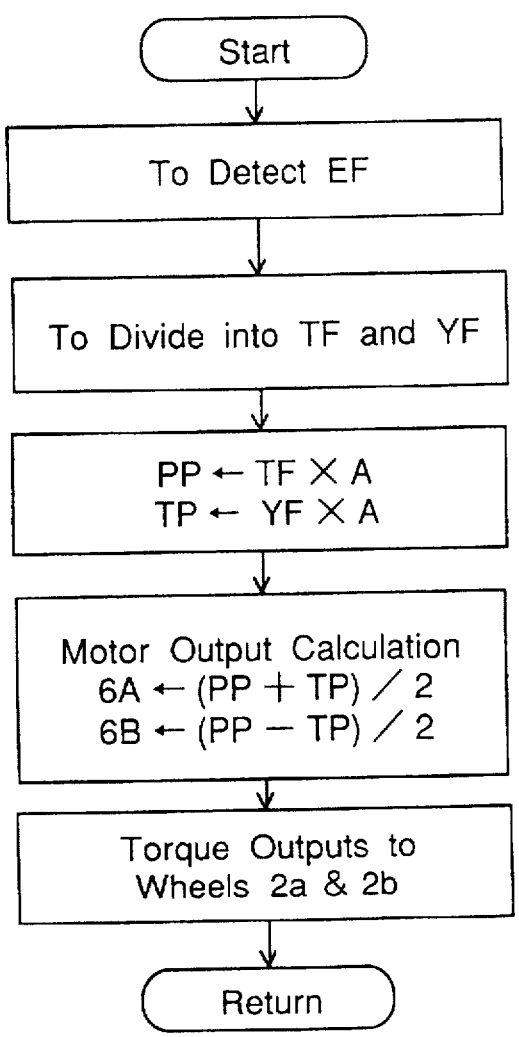
FIG. 1 is a diagram showing a flow of control executed in the power-assisted cart according to a first preferred embodiment of the present invention.

Referring now to FIG. 1, an external pushing or pulling force EF, for example, a pull, applied to the handle 4 to move the cart in a forward direction as shown by the arrow is detected by the force detecting device 5 and is then divided into two force components, that is, a thrust force TF acting to advance the power-assisted cart 10 and a yawing force YF acting to turn the power-assisted cart 10 either leftwards or rightwards. The control device 7 then calculates a propelling power PP by multiplying the detected thrust force TF by a predetermined amplification factor A, for example, 3, and, also, a turning power TP by multiplying the detected yawing force YF by the predetermined amplification factor A.

It is to be noted that, assuming that as shown in FIG. 2B Lc represents the distance between a mid-center line of the handle 4 (the line parallel to the longitudinal axis of the handle bar 4a) and the common axis with which the driving wheels 2a and 2b are aligned, Lt represents the distance between the driving wheels 2a and 2b and Z represents a point intermediate between the driving wheels 2a and 2b, the relationship expressed by [TP×Lt/2=(YF×Lc)×A] is established. However, in describing the various embodiments of the present invention, the ratio Lt:Lc is assumed to be 2:1 for the sake of brevity.

The control device 7 then supplies first and second torque outputs respectively to the left and right drive sources 6A and 6B. The first torque output is indicative of the torque at which the driving wheel 2a should be driven by the drive source 6A and which is of a value equal to one half of the difference between the calculated propelling and turning powers, i.e., (PP−TP)/2, and the second torque output is indicative of the torque at which the driving wheel 2b should be driven by the drive source 6B and which is of a value equal to one half of the sum of the calculated propelling and turning powers, i.e., (PP+TP)/2, so that the left and right driving wheels 2a and 2b can be driven at the respective torques so calculated by the control device 7, thereby completing one cycle of control flow that has started from the detection of the external force. This cycle of control flow is repeatedly executed so long as the system is powered on with the external force EF applied to the handle 4.

Thus, it will readily be seen that an assisted power of a magnitude equal to the magnitude of the external force EF multiplied by the predetermined amplification factor is applied to the left and right driving wheels 2a and 2b to drive the power-assisted cart 10 in a predetermined or desired direction.

Modification 1

Figure 4A:
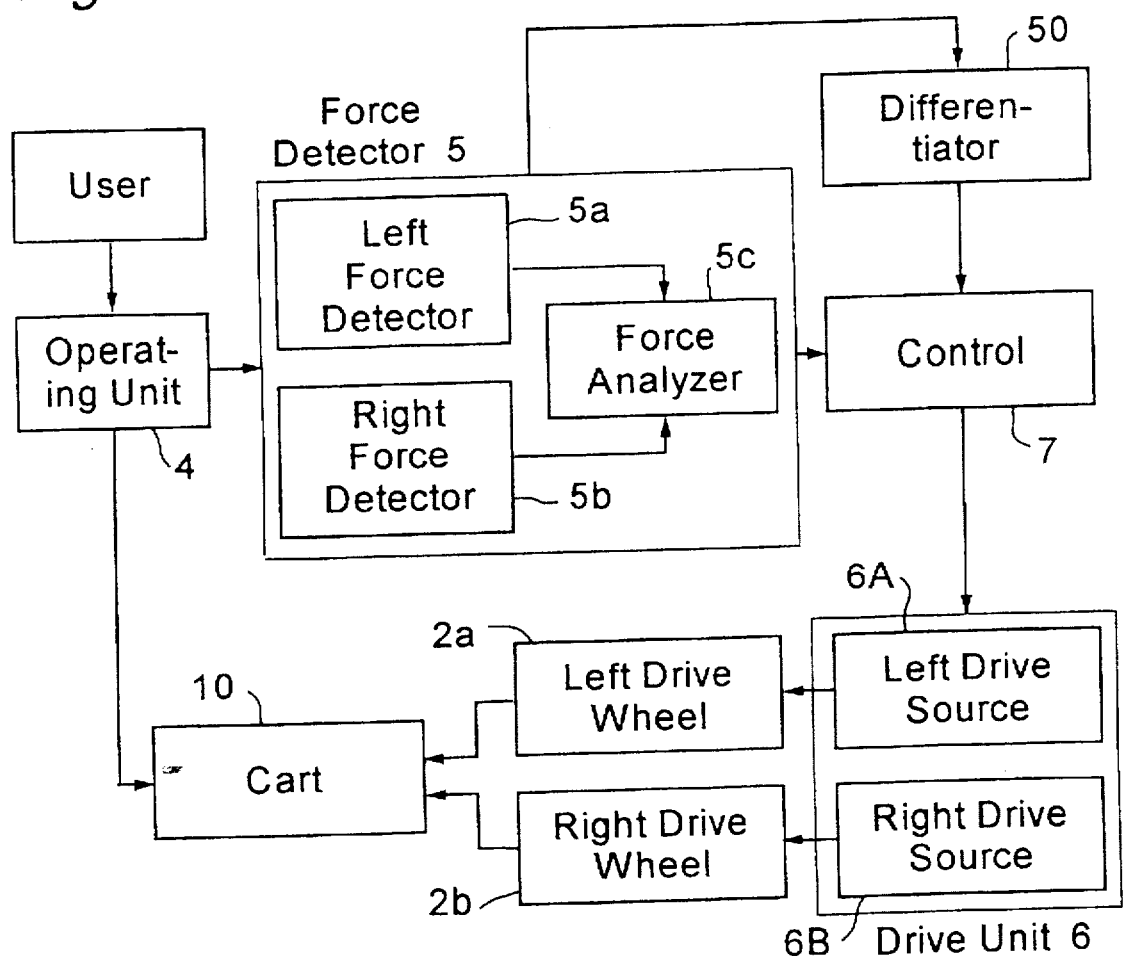
FIG. 4A is a diagram similar to FIG. 1 showing a first modification of the first embodiment of the present invention.
Figure 4B:
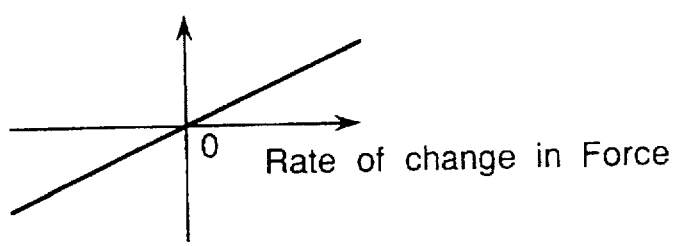
FIG. 4B is a schematic diagram showing change in magnitude of the force to be added to the assisted power in the practice of the first modification shown in FIG. 4A.

If in the foregoing embodiment of the present invention the amplification factor A is fixed, the external force EF applied to the handle 4 must be increased where the external force EF so increased is required such as occurs when the power-assisted cart 10 is to be started or halted or when the power-assisted cart 10 climbs over a bump on a ground surface. In order to lessen the necessity of the increased external force EF to be applied to the handle 4, the use is made of a differentiator 50, as shown in FIG. 4A, for detecting the rate of change of the detected external force (a differential value of the detected external force EF) so that, as shown in FIG. 4B, the assisted power can be increased by a quantity variable with the rate of change of the detected external force. The control flow for this purpose is shown in FIG. 5.

Figure 5:
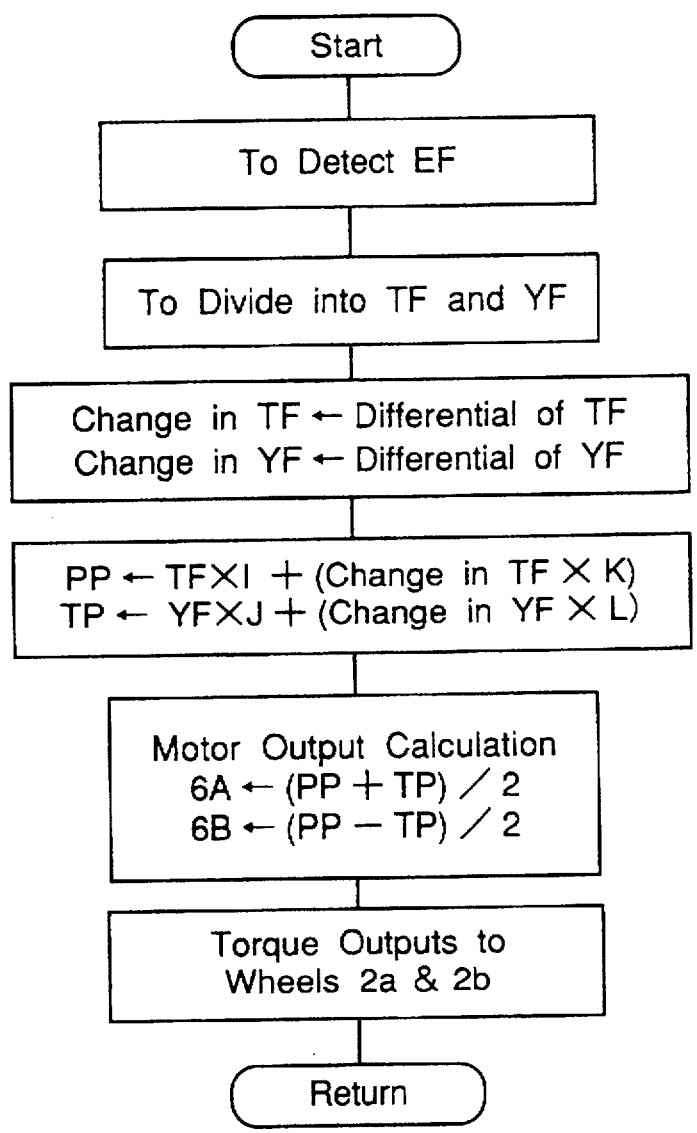
FIG. 5 is a diagram similar to FIG. 1 showing a second modification of the first embodiment of the present invention.

As shown in FIG. 5, due to the detection being made of the rate of change of the detected external force according to this modification, the propelling power PP is of a value equal to the product of the thrust force TF by a first predetermined amplification factor I plus the product of the change in thrust force TF by a first predetermined coefficient K while the turning power TP is of a value equal to the product of the yawing force YF by a second predetermined amplification factor J plus the product of the change in yawing force YF by a second predetermined coefficient L.

Modification 2

Figure 6A:
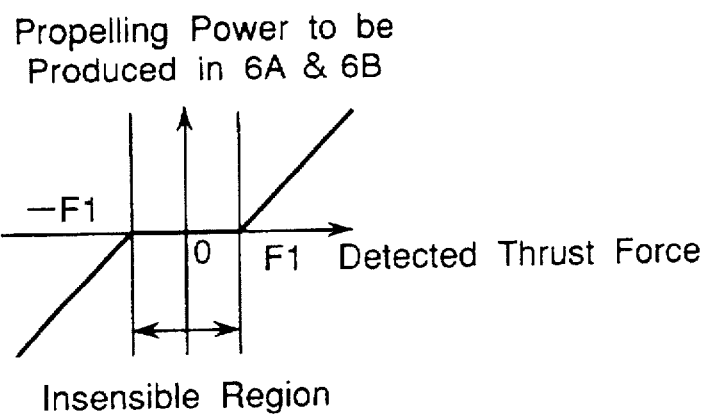
FIGS. 6A and 6B are diagram showing how propelling and turning powers are adjusted according to the detected thrust and yawing forces, respectively, in the practice of a second modification of the first embodiment of the present invention.
Figure 6B:
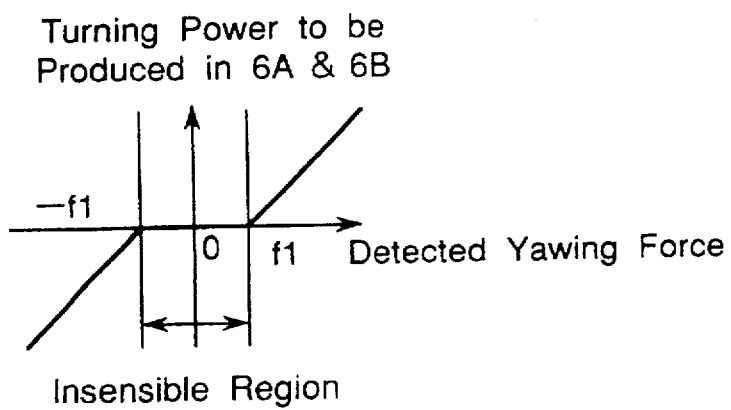
Figure 7:
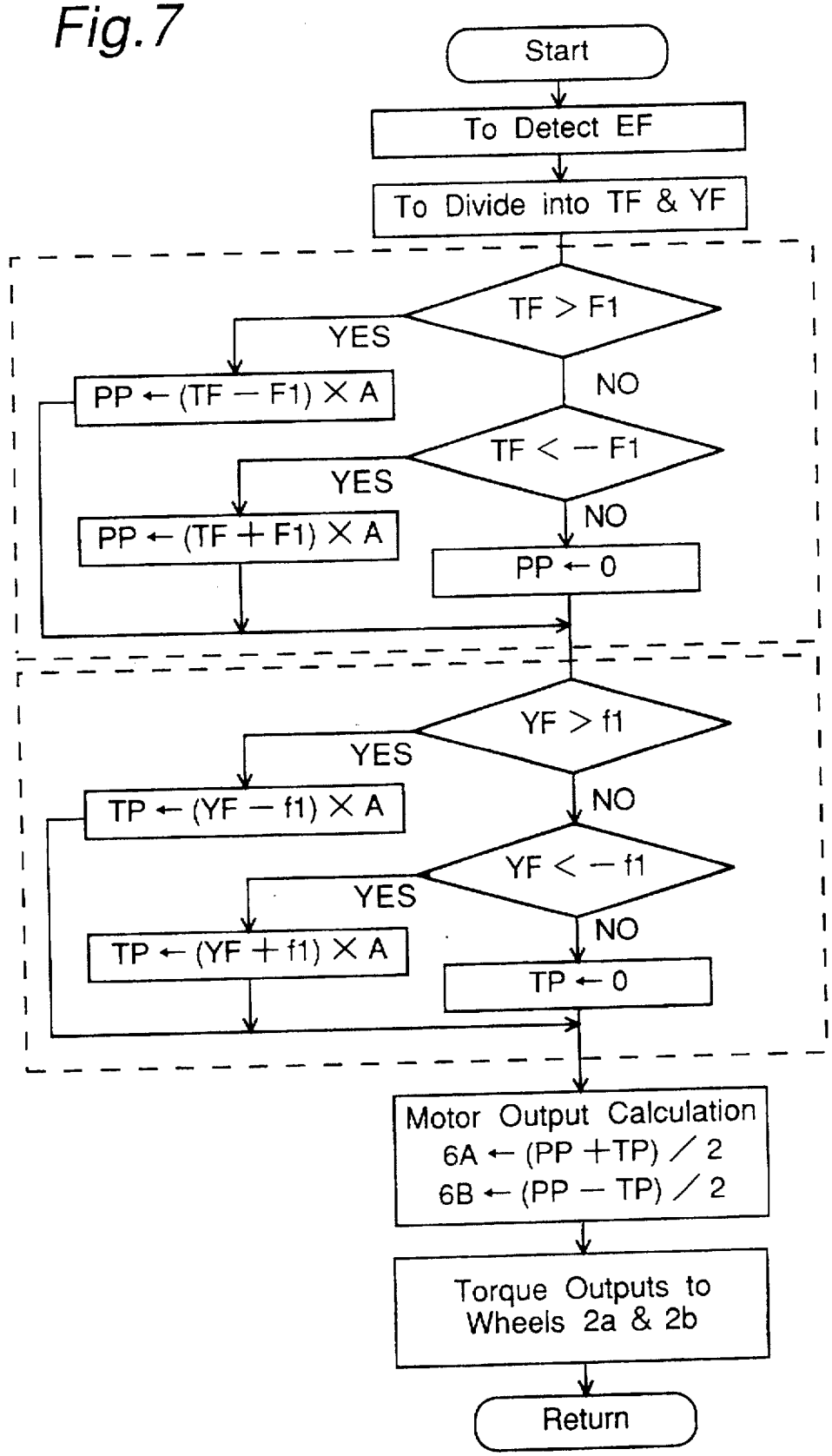
FIG. 7 is a diagram showing a flow of control executed in the power-assisted cart according to the second modification of the first embodiment of the present invention.
Figure 8A:
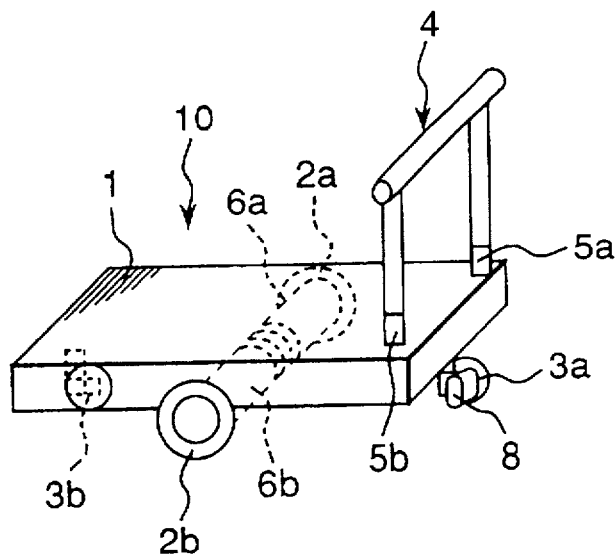
FIG. 8A is a schematic perspective view of the power-assisted cart according to a second preferred embodiment of the present invention.
Figure 8B:
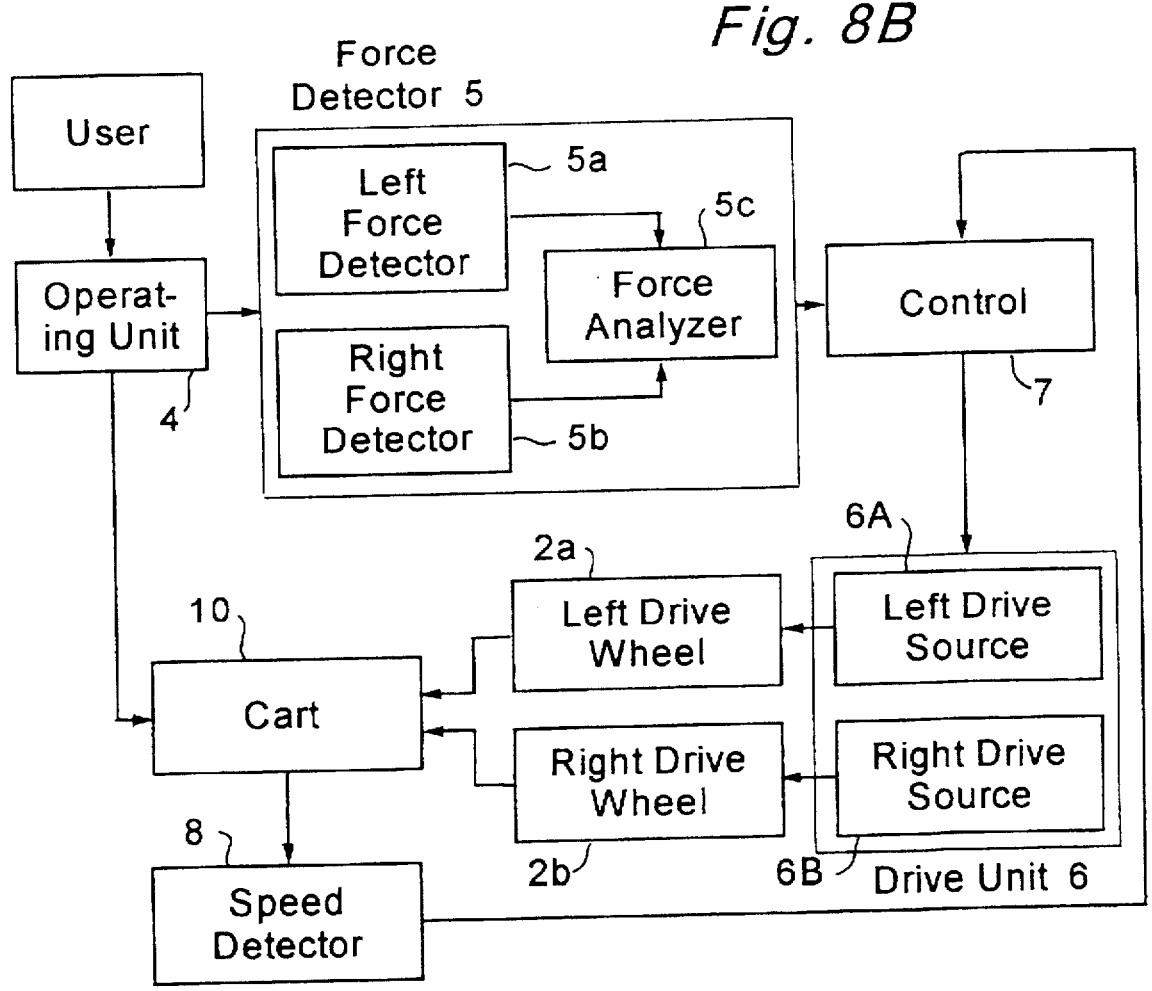
FIG. 8B is a block diagram of the drive system employed in the power-assisted cart according to the second embodiment of the present invention.
Figure 9:
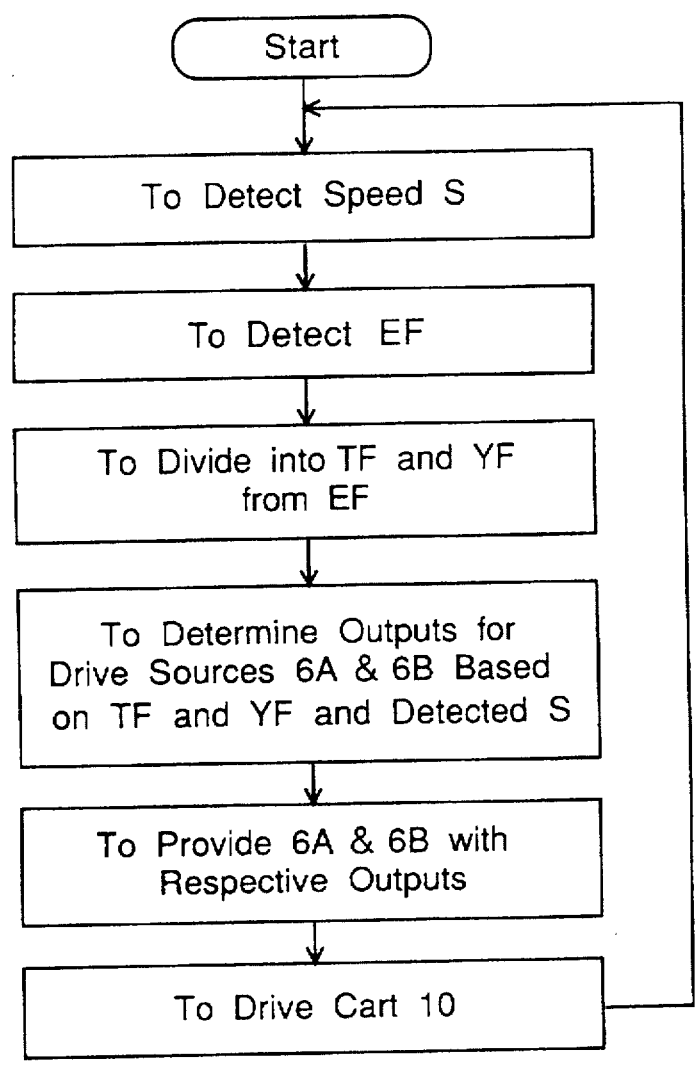
FIG. 9 is a diagram showing a flow of control executed in the power-assisted cart according to the second embodiment of the present invention.

In order for the power-assisted cart 10 to be smoothly moved and, at the same time, for an accurate and precise control of the power-assisted cart 10 to be accomplished, the force detecting device 5 should be of a design capable of detecting accurately and precisely the external force EF applied to the handle 4. In such case, it may happen that while the operator of the power-assisted cart 10 then gripping the handle 4 has no intention to move the cart 10, the external force detecting device 5 may detect the external force EF applied to the handle 4, eventually accompanied by driving of the driving wheels 2a and 2b. To avoid this possibility, as shown in FIGS. 6A and 6B, an insensible region is provided at a region where the external force EF is slight. In other words, a region of the detected thrust force between values F1 and −F1 and a region of the detected yawing force between values f1 to −f1 are defined as respective insensible regions. Accordingly, according to this modification of the preferred embodiment of the present invention, in the event that the detected external force is slight, neither the propelling power PP nor the turning power TP is produced, thereby avoiding any possible unnecessary motion of the power-assisted cart 10. This can be accomplished by providing the control device 7 with a discriminator operable to determine if the applied external force is of a value higher or lower than the insensible region of a predetermined value. The control flow for this purpose is shown in FIG. 7.

Second Preferred Embodiment (FIGS. 8 to 23)

Referring particularly to FIGS. 8A and 8B to FIG. 10, the power-assisted cart 10 according to a second preferred embodiment of the present invention makes use of a speed detector 8 for detecting the travelling speed S of the power-assisted cart 10 so that the assisted power can be controlled according to the detected travelling speed. For this purpose, the speed detector 8 is operatively coupled with one of the front and rear casters 3a and 3b, for example, the rear caster 3b, to detect the rotational speed of the rear caster 3b. In other words, in the embodiment shown in FIGS. 8 to 9, the torque control is carried in dependence on not only the external force EF applied to the handle 4 but also the travelling speed of the power-assisted cart 10 and, accordingly, the rate of change in travelling speed brought about by the assisted power can be controlled to a proper value.

Figure 10A:
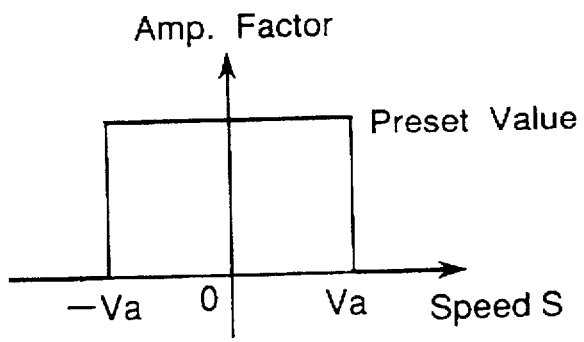
FIG. 10A is a diagram showing how the amplification factor varies according to the travelling speed of the power-assisted cart according to the second embodiment of the present invention.
Figure 10B:
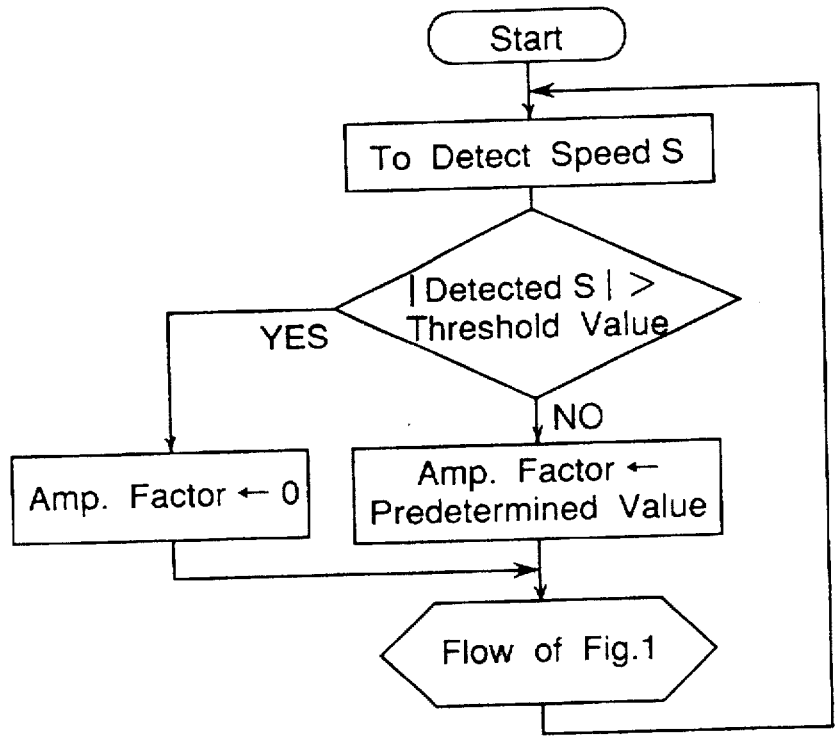
FIG. 10B is a diagram showing a flow of control executed in the power-assisted cart in reference to the graph shown in FIG. 10A.

By way of example, as shown in FIG. 10A, in the event that the travelling speed S detected by the speed detector 8 exceeds a predetermined value, the amplification factor is nulled so that the torque outputs from the drive unit 6 can be disabled to thereby avoid any possibility that the power-assisted cart 10 may be driven too fast or run out of control. The flow control for this purpose is shown in FIG. 10B.

Modification 1

Figure 11:
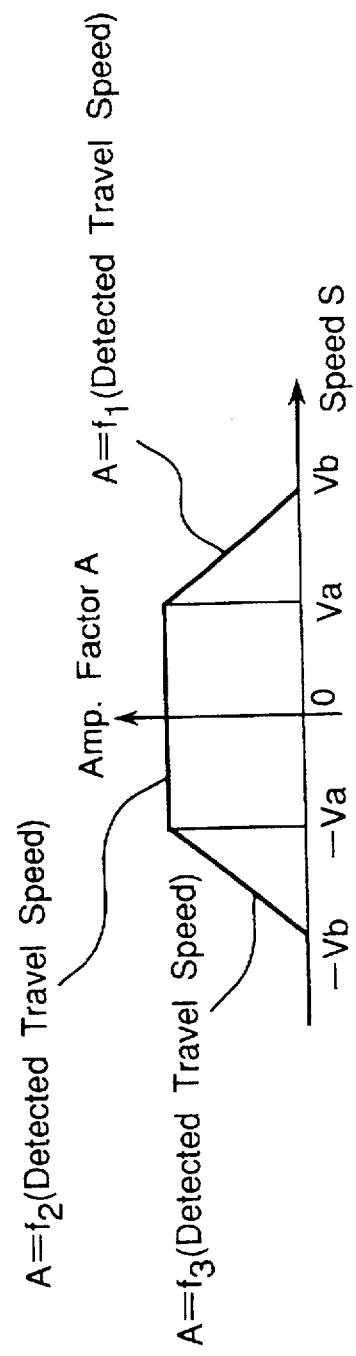
FIG. 11 is a diagram showing how the amplification factor should be increased in reference to the travelling speed according to a first modification of the second embodiment of the present invention.
Figure 12:
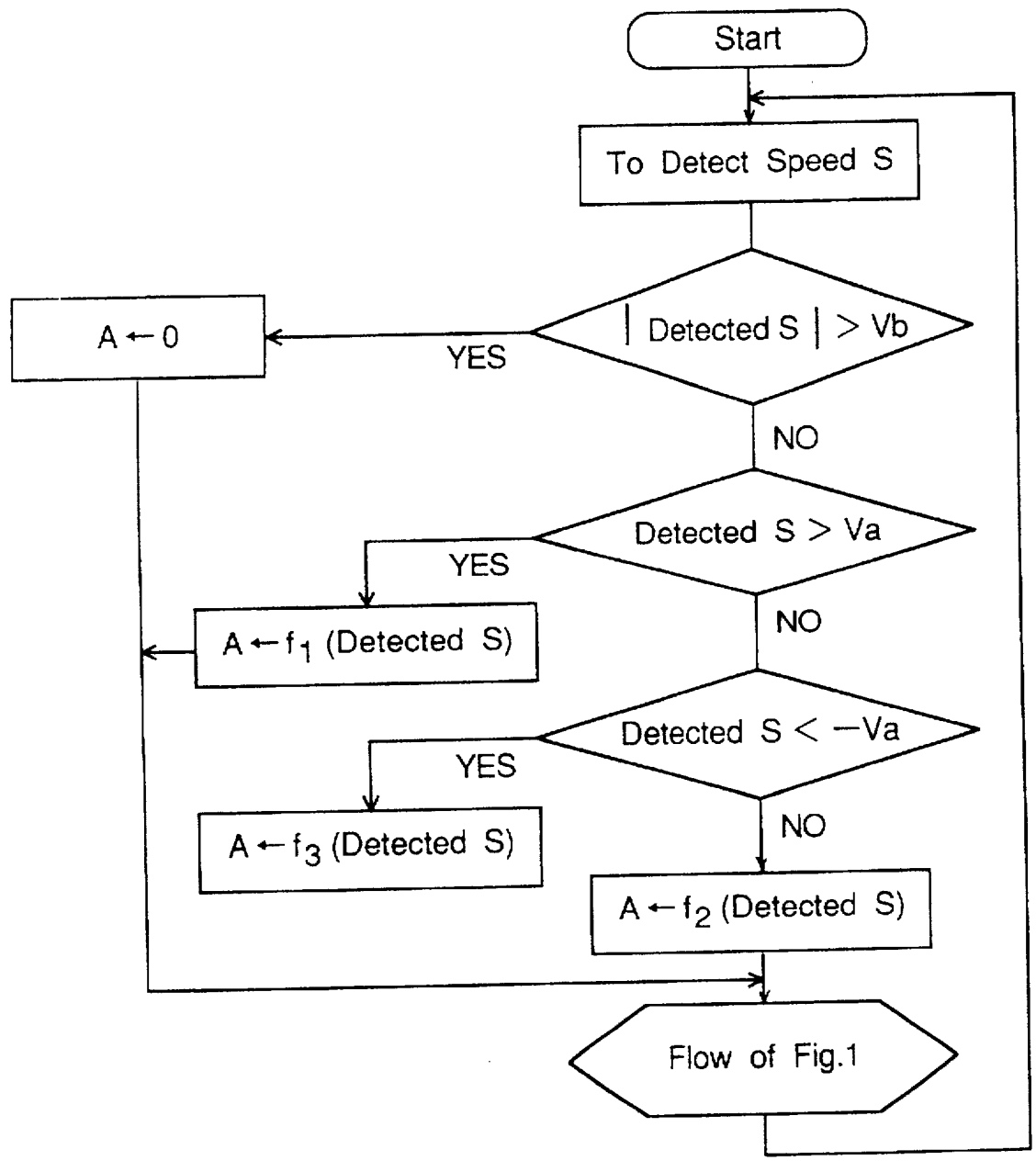
FIG. 12 is a diagram showing a flow of control executed in the power-assisted cart according to the first modification of the second embodiment of the present invention.

Alternatively, the amplification factor may be varied depending on the travelling speed S of the power-assisted cart 10 to secure a safety factor and also to accomplish a smooth variation of the torque output relative to change in travelling speed so that the operator can have a comfortable response from the handle 4 during pushing or pulling the power-assisted cart 10. More specifically, as shown in FIGS. 11 and 12, so long as the travelling speed S of the power-assisted cart 10 has not yet attained a threshold value Va or −Va (It is to be noted that the negative sign used in connection with the threshold value accounts that the power-assisted cart 10 is moved backwards. Hereinafter, the same), the predetermined amplification factor A is employed, but once it exceeds the threshold value Vb or −Vb, the amplification factor is nulled so that the torque outputs from the drive unit 6 can be disabled to thereby avoid any possibility that the power-assisted cart 10 may be driven too fast or run out of control.

Modification 2

The assisted power of a magnitude equal to the difference between the assisted power calculated according to the applied external force less a force of a magnitude corresponding to the viscous resistance VR proportional to the travelling speed may be added, rather than employing the force amplification factor variable according to the travelling speed such as discussed above. FIG. 13 illustrates change in quantity of the added power determined in terms of a ratio between the coefficient of viscosity VC and the travelling speed when the latter is in excess of a threshold value Vc or −Vc, and FIG. 14 shows the control flow employed for this purpose. The viscous resistance VR applied according to the travelling speed acts as a braking force in a manner similar to an engine brake. Accordingly, any possible hazardous situation which would occur when the travelling speed is too high can be substantially avoided. At the same time, since the torque output can vary smoothly relative to change in travelling speed, the operator can have a comfortable response from the handle 4, accompanied by increase in operativity. It is to be noted that the gradient of the curve shown in FIG. 13 represents a change of the coefficient of viscosity VC.

Modification 3

Figure 15:
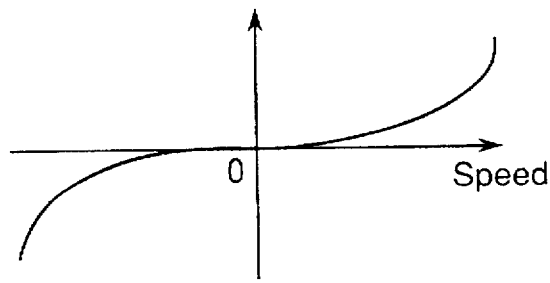
FIG. 15 is a diagram showing how the amplification factor should be increased in reference to the travelling speed according to a third modification of the second embodiment of the present invention.
Figure 16:
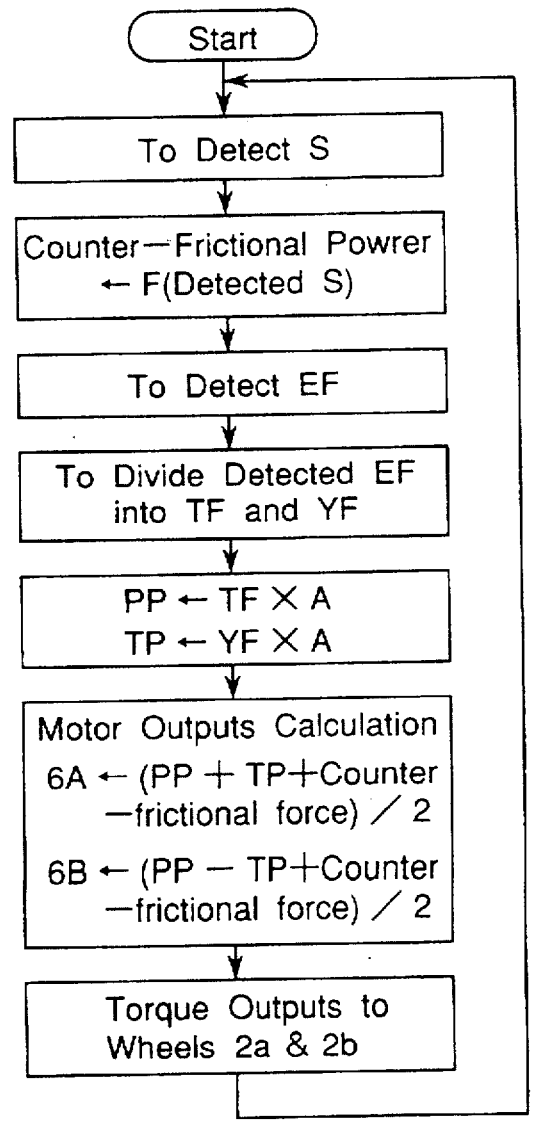
FIG. 16 is a diagram showing a flow of control executed in the power-assisted cart according to the third modification of the second embodiment of the present invention.

When the power-assisted cart 10 travels, the rolling resistance increase with increase of the travelling speed. Accordingly, if based on the control flow shown in FIG. 16, the assisted power calculated according to the applied external force EF is added with the additional power of a value appropriate to the travelling speed as shown in FIG. 15 as a counter-travelling resistance effective to counterbalance the travelling resistance, the operator can have a comfortable response from the handle 4 without feeling the travelling resistance acting on the power-assisted cart 10.

Modification 4

Figure 17:
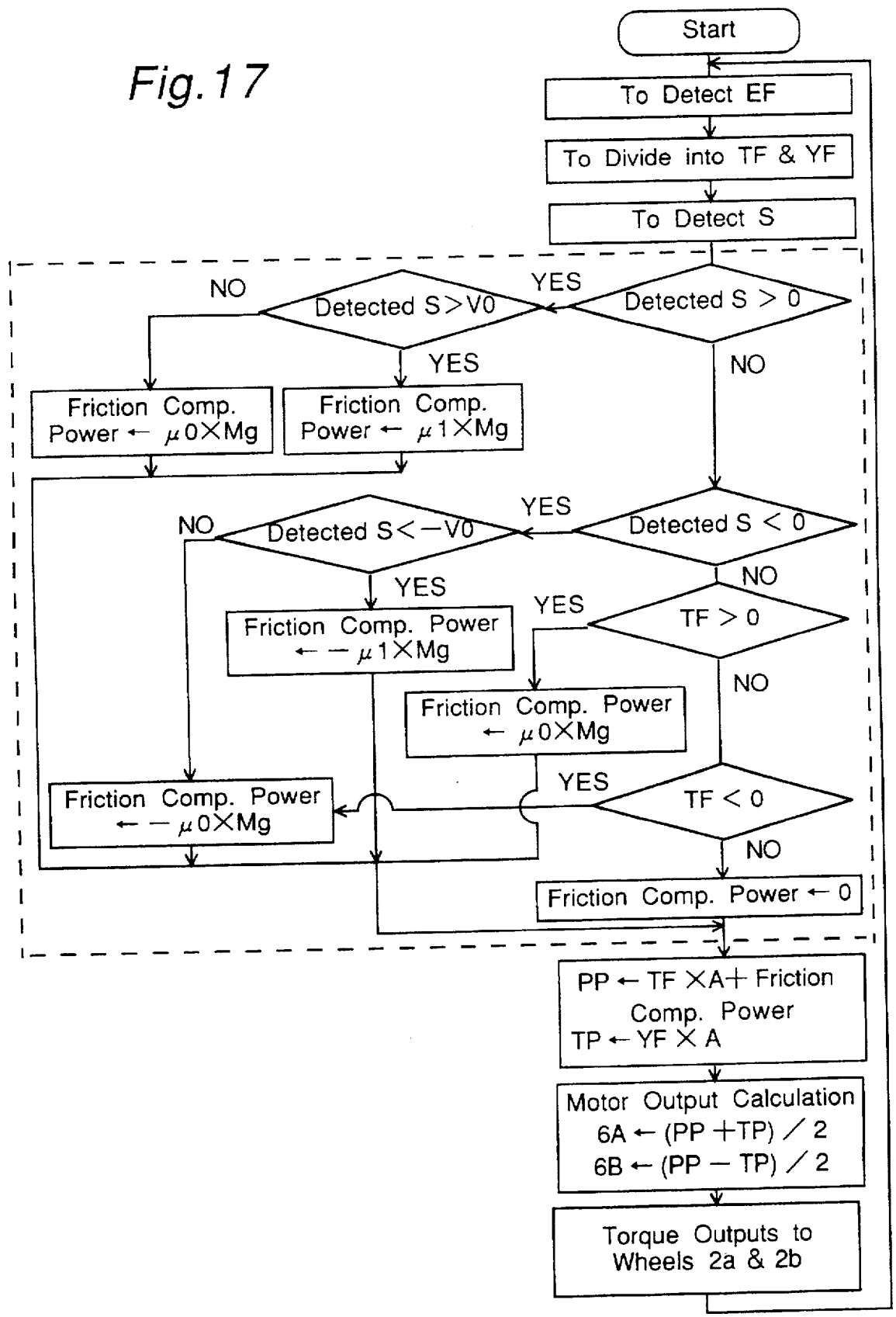
FIG. 17 is a diagram showing a flow of control executed in the power-assisted cart according to a fourth modification of the second embodiment of the present invention.
Figure 18:
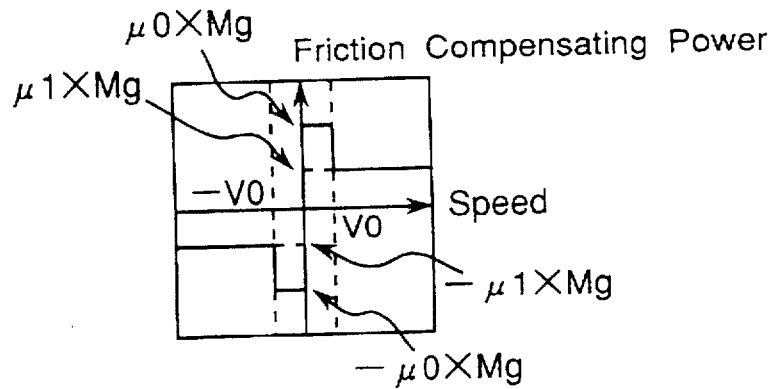
FIG. 18 is a diagram showing how the friction compensating force should be added in reference to the travelling speed according to the third modification of the second embodiment of the present invention.

Considering that static friction acts on the power-assisted cart 10 when the travelling speed of the power-assisted cart 10 is of a value lower than an extremely low value, as shown in FIGS. 17 and 18, the assisted power may be added with a friction compensating power of a magnitude corresponding to the amount of this static friction ($\mu 0 \times Mg$, wherein M represents the mass of the platform 1 and g represents the gravitational acceleration) so long as the travelling speed is in excess of zero and, at the same time, lower than a threshold value V0 which is the extremely low value referred to, but with a friction compensating power of a magnitude corresponding to the amount of dynamic friction ($\mu 1 \times Mg$) so long as the travelling speed is in excess of the threshold value V0. By so doing, starting and stopping of the power-assisted cart 10 can take place smoothly, providing the operator with a comfortable response from the handle 4.

Modification 5

Figure 19:
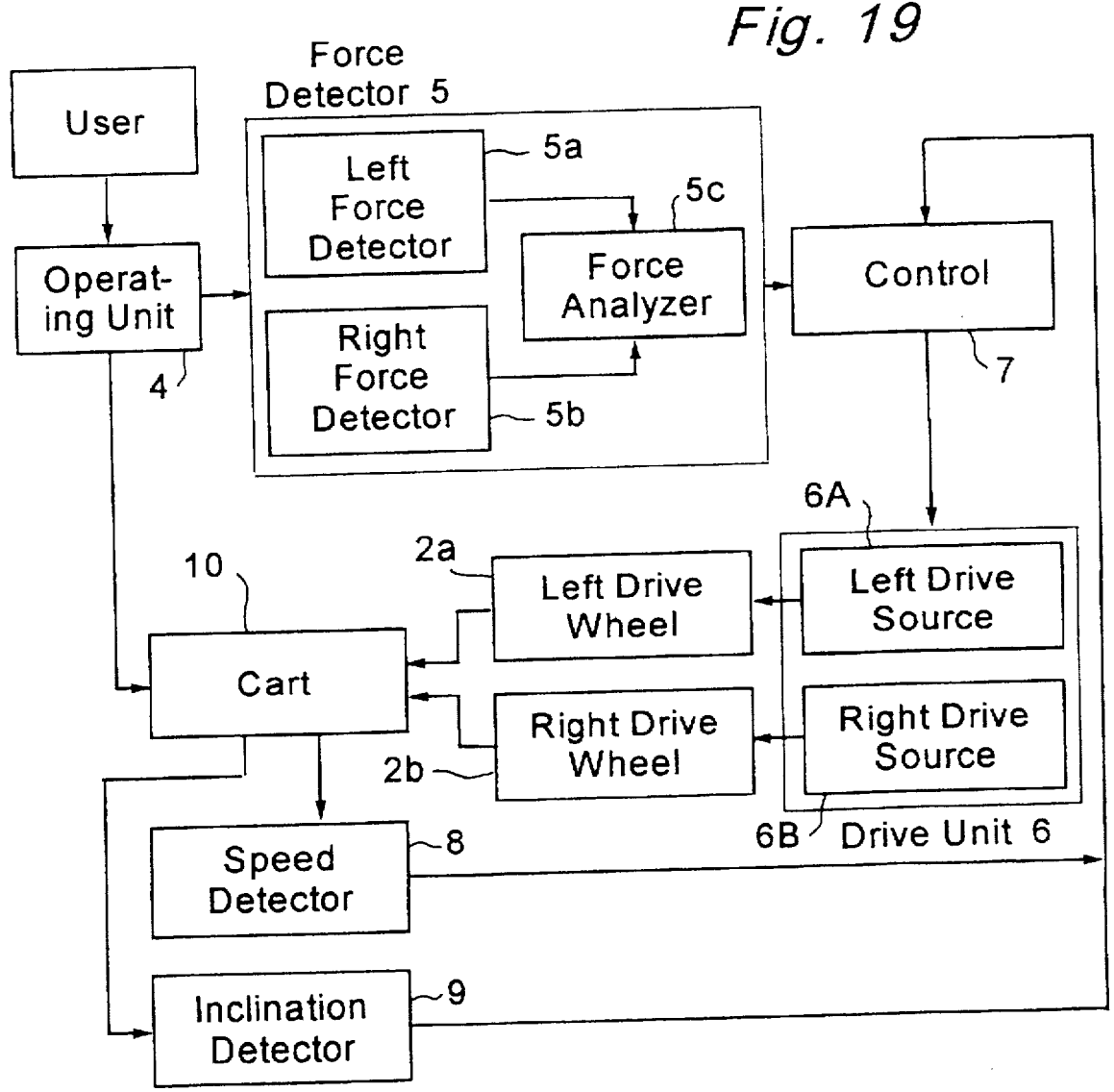
FIG. 19 is a block diagram of the drive system according to a fifth modification of the second embodiment of the present invention.
Figure 20:
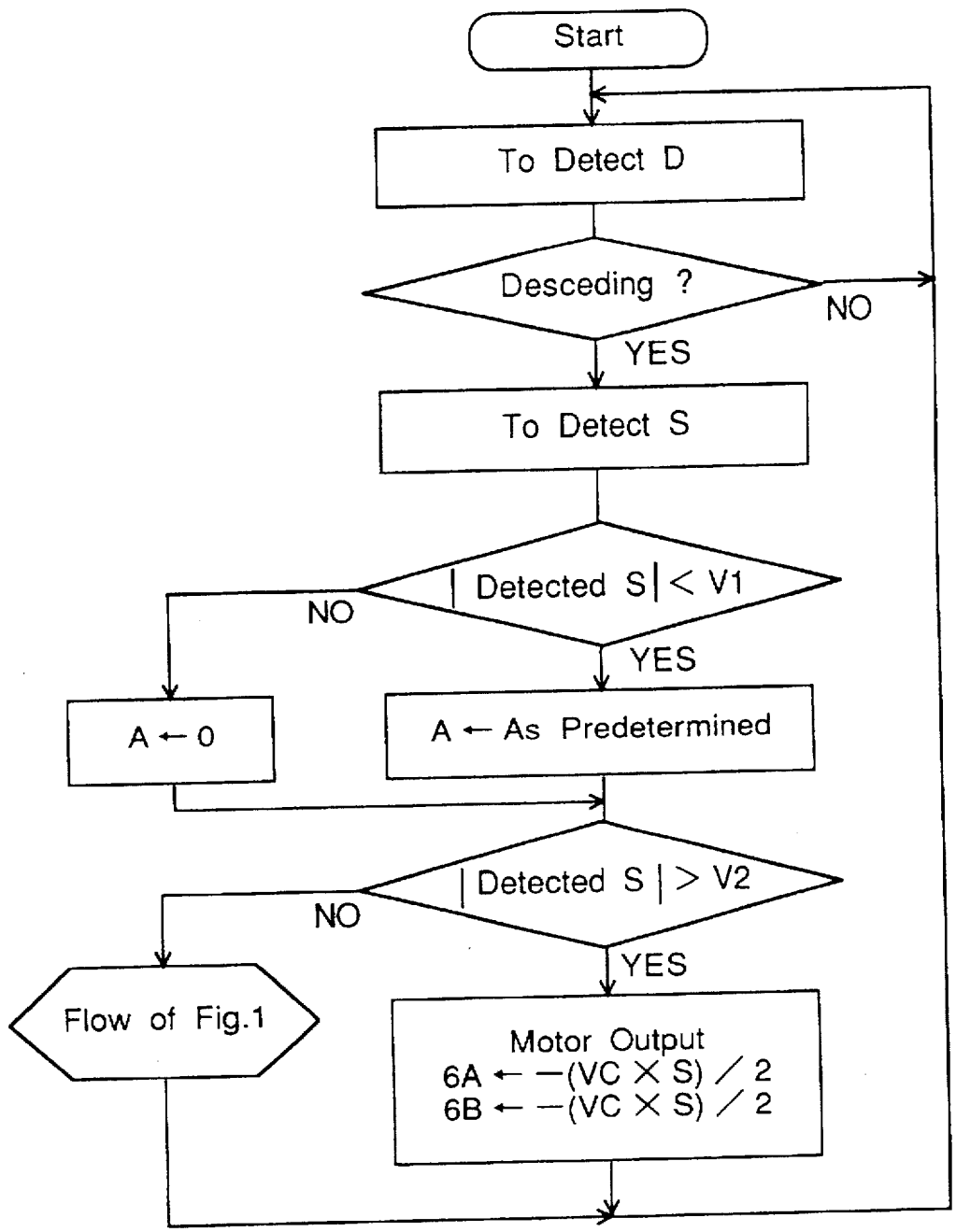
FIG. 20 is a diagram showing a flow of control executed in the power-assisted cart according to the fifth modification of the second embodiment of the present invention.

As shown in FIG. 19, the use may be made of an inclination detector 9 for detecting the angle of inclination of the wheeled platform 1 so that whether the power-assisted cart 10 is climbing a slope or whether the power-assisted cart 10 is descending the slope can be determined. Where this inclination detector 9 is used, as shown in FIG. 20, the amplification factor is nulled to remove the assisted power in the event that the inclination detector 9 indicates the power-assisted cart 10 descending the slope with the travelling speed exceeding a first predetermined value V1 (representative of a somewhat dangerous travelling speed), but the viscous resistance determined by multiplying the coefficient of viscosity VC by the travelling speed is added to effect a braking in a manner similar to an engine brake in the event that the travelling speed attains a second predetermined value V2 and hence falls in a range of dangerous travelling speeds. According to this modification, a hazardous condition which would occur when the power-assisted cart 10 descends the slope at an accelerated speed can advantageously be eliminated.

Figure 30:
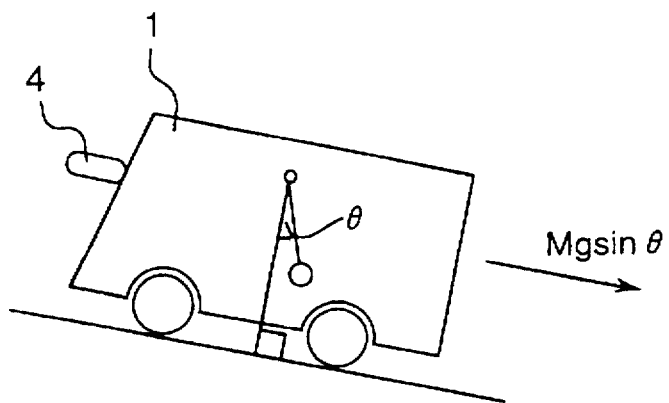
FIG. 30 is a schematic side view of the power-assisted cart showing a first modification of the fifth embodiment of the present invention.

The inclination detector 9 may be of a structure comprising, as shown in FIG. 30, a weight suspended from inside the wheeled platform by means of a string so that change θ in angle of inclination delimited between the string and a plane perpendicular to the wheeled platform 1 can be detected during the power-assisted cart 10 descending or ascending the slope.

Figure 21A:
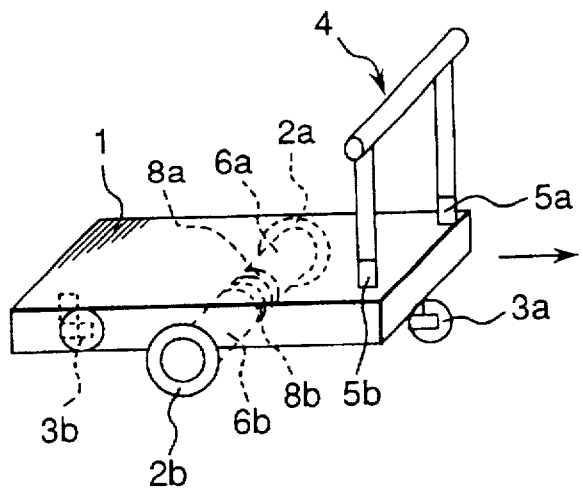
FIG. 21A is a schematic perspective view of the power-assisted cart according to a third preferred embodiment of the present invention.
Figure 21B:
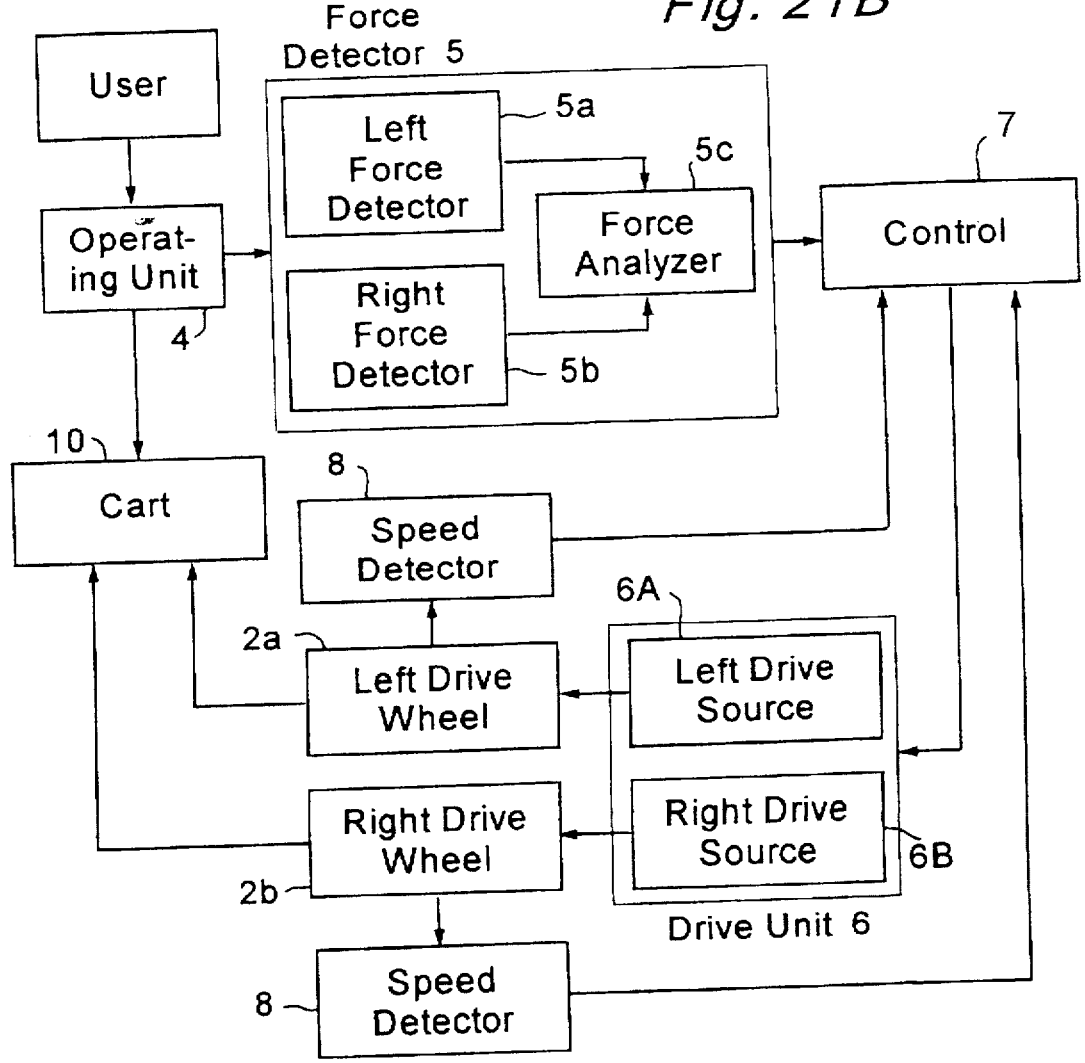
FIG. 21B is a diagram showing the driving system employed in the power-assisted cart shown in FIG. 21.
Figure 22:
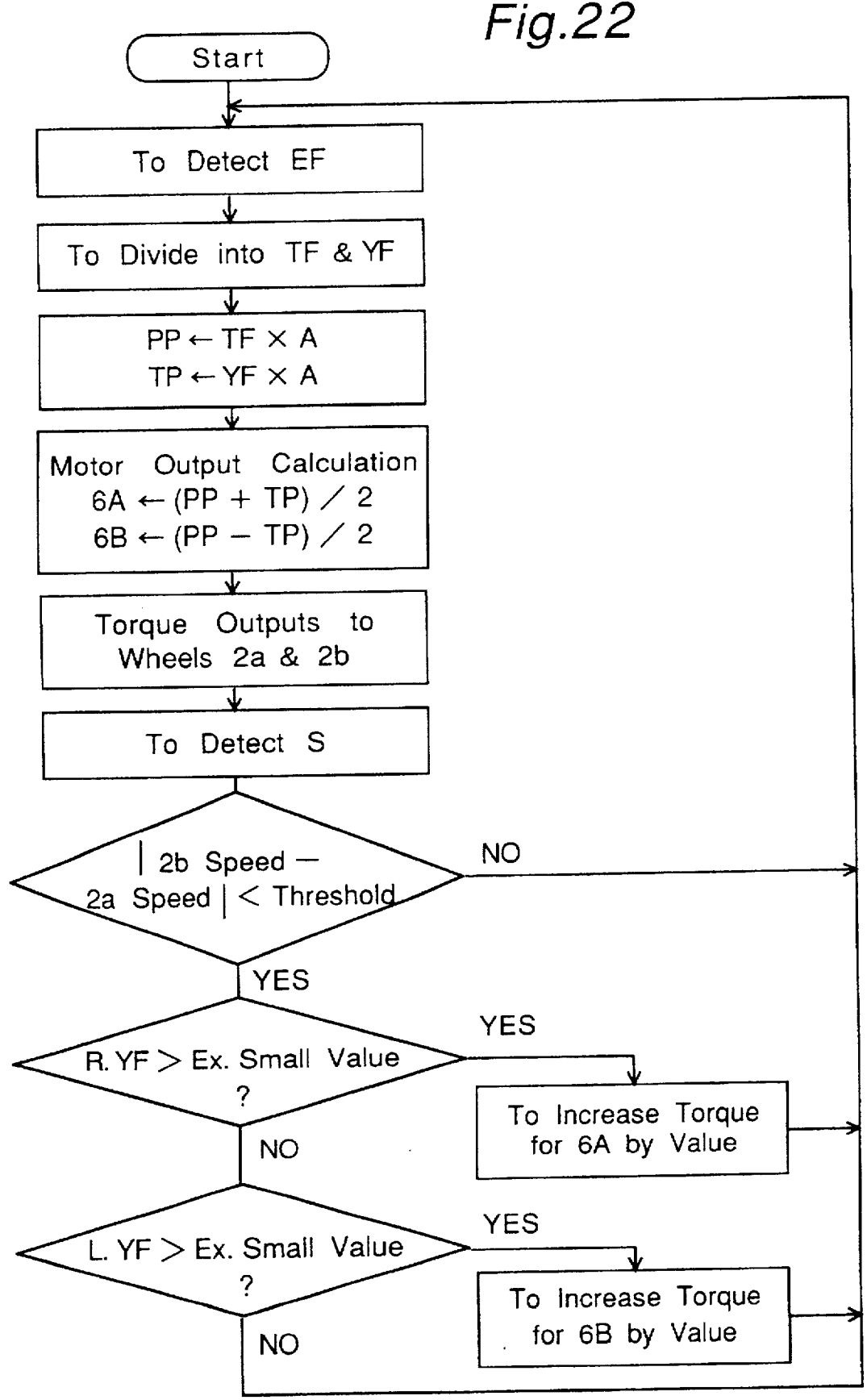
FIG. 22 is a diagram showing a flow of control executed in the power-assisted cart according to the third embodiment of the present invention.
Figure 23:
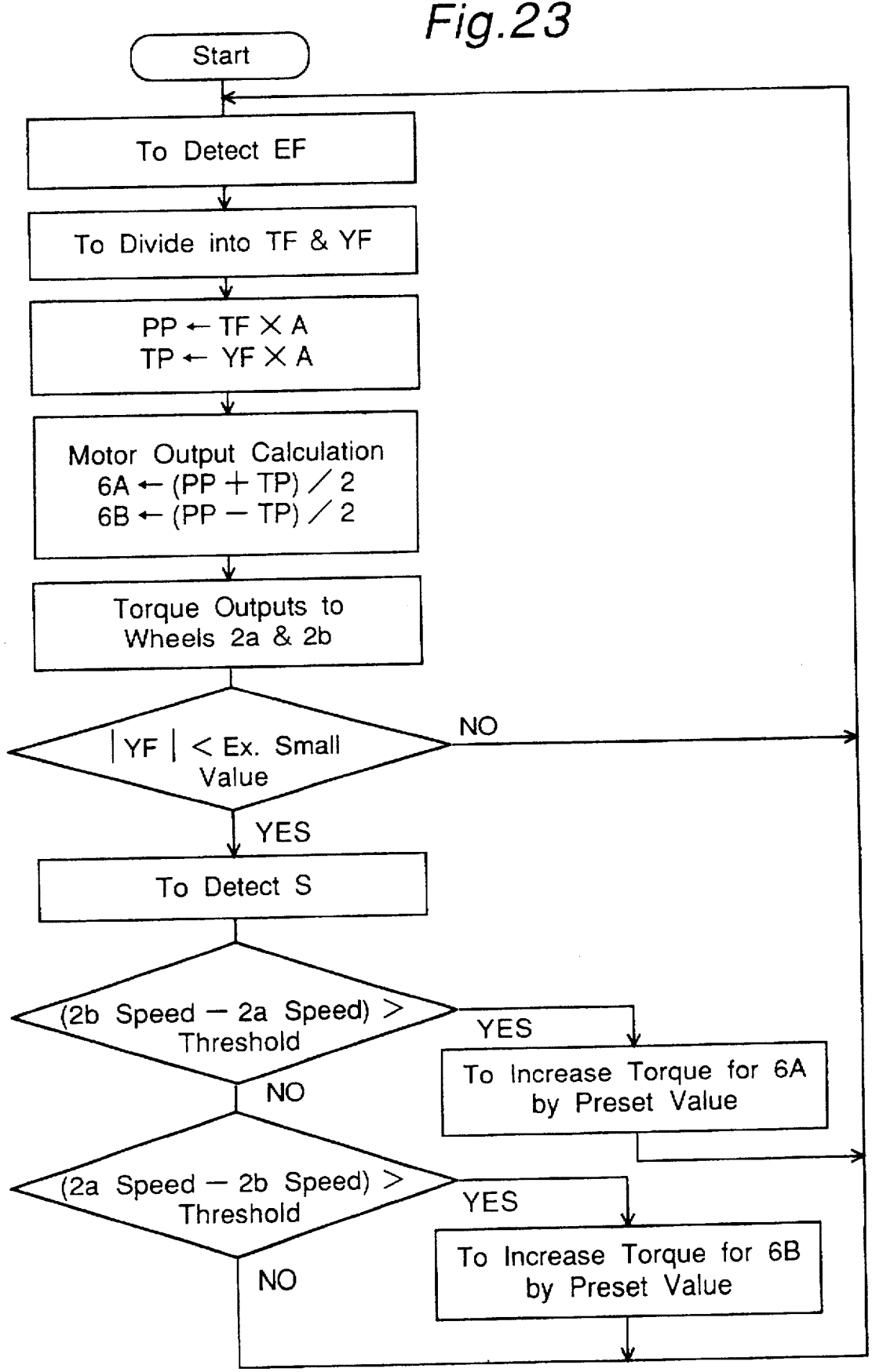
FIG. 23 is a diagram showing a flow of control executed in the power-assisted cart according to a first modification of the third embodiment of the present invention.

Third Preferred Embodiment (FIGS. 21 to 23)

Referring particularly to FIG. 21A, the power-assisted cart 10 according to the third preferred embodiment is of a design wherein the driving wheels 2a and 2b are driven independently by the respective drive sources 6A and 6B and the driving wheels 2a and 2b concurrently serve as the steering wheels.

In this embodiment, as shown in FIG. 21B, the use is made of a left speed detector 8a for detecting the rotational speed of the left driving wheel 2a and a right speed detector 8b for detecting the rotational speed of the right driving wheel 2b so that the assisted power for each drive source 6A and 6B can be corrected in dependence on the rotational speed of the associated drive source 6A and 6B. According to this modification, the power-assisted cart 10 can be stably maneuvered regardless of a surface condition of the ground surface on which it travels.

This will now be described with reference to FIG. 22. When during the power-assisted cart 10 being turned the difference between the respective rotational speeds of the driving wheels 2a and 2b is small as compared with the external force acting in a direction in which the power-assisted cart 10 is to be turned, the assisted power for one of the driving wheels 2a and 2b is increased to increase the difference between the respective assisted powers for the driving wheels 2a and 2b. By so doing, the turning performance of the power-assisted cart 10 can be increased. In particular, even when the power-assisted cart 10 climbs a slope in a generally zig-zag fashion or a different coefficient of friction acts on the tread of each of the driving wheels 2a and 2b, the power-assisted cart 10 can be turned smoothly.

Modification 1

Conversely, as shown in FIG. 23, if the difference between the respective rotational speeds of the driving wheels 2a and 2b is large as compared with the external force acting in a direction in which the power-assisted cart 10 is to be turned, the capability of the power-assisted cart 10 to run straightforward can be improved by effecting a correction to increase the assisted power for one of the driving wheels 2a and 2b which rotates at a lower rotational speed. By so doing, the straight travelling performance of the power-assisted cart 10 can be increased. In particular, even when the power-assisted cart 10 climbs a slope in a generally zig-zag fashion or a different coefficient of friction acts on the tread of each of the driving wheels 2a and 2b, the power-assisted cart 10 can be run straight smoothly.

Fourth Preferred Embodiment (FIGS. 24 to 29)

Figure 24A:
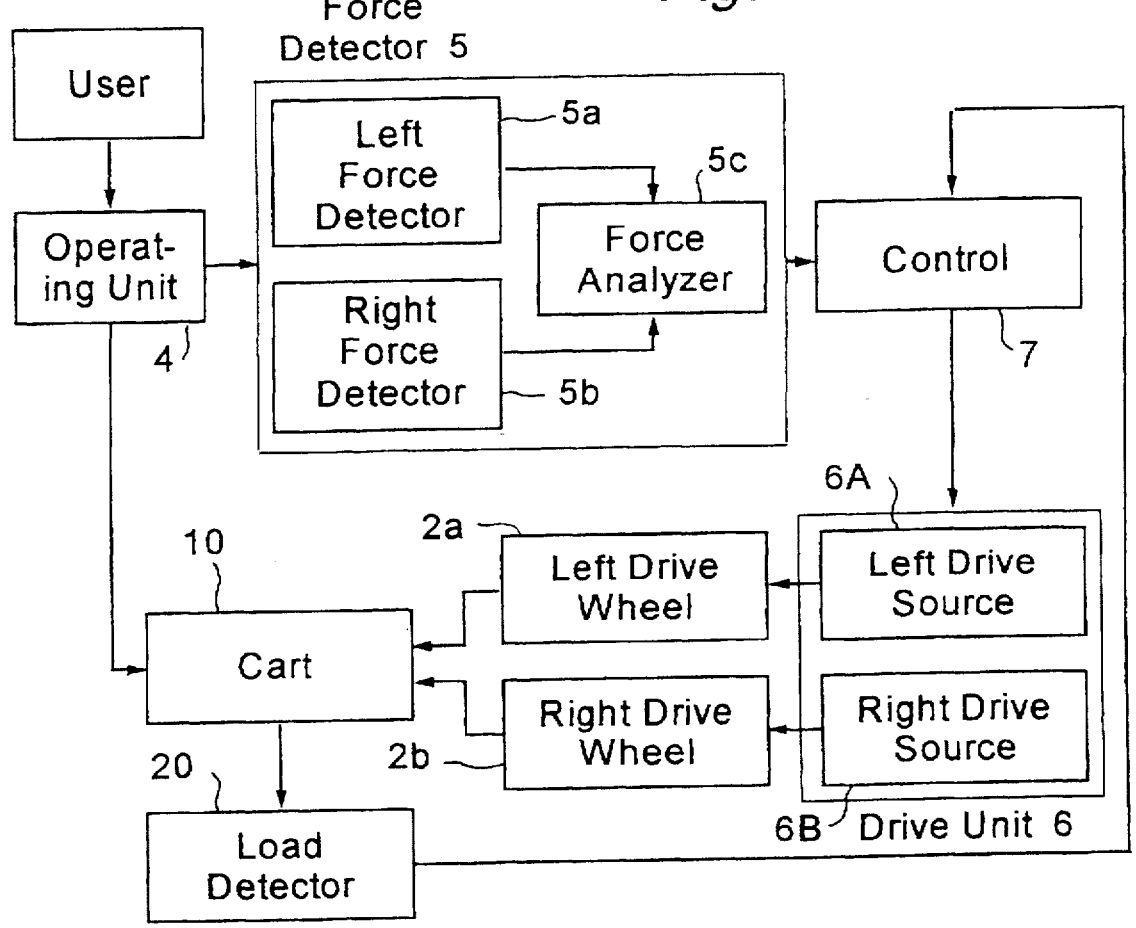
FIG. 24A is a diagram showing the driving system employed in the power-assisted cart according to a fourth preferred embodiment of the present invention.
Figure 24B:
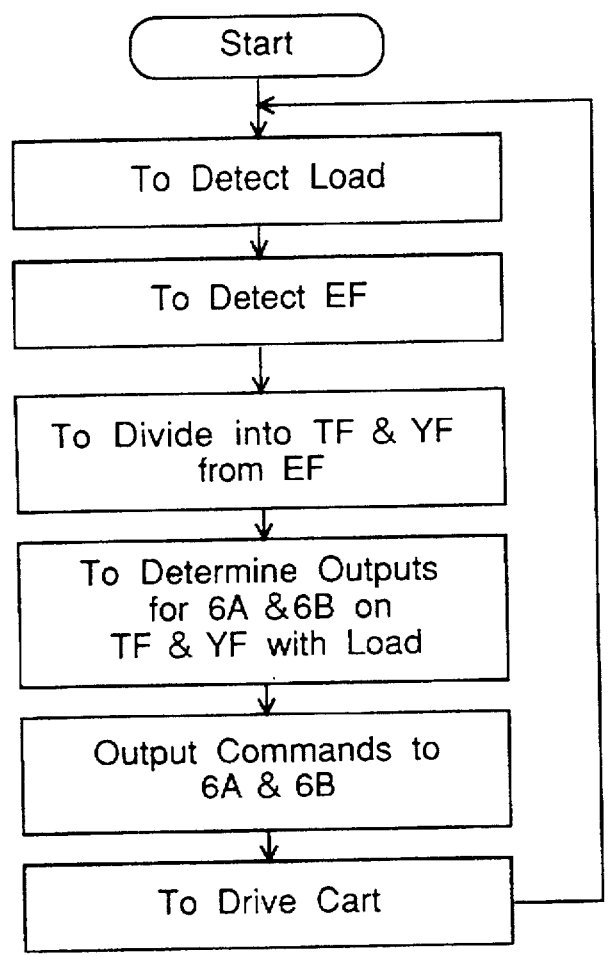
FIG. 24B is a diagram showing a flow of control executed in the power-assisted cart according to the fourth embodiment of the present invention.

Referring to FIG. 24A, the power-assisted cart 10 shown therein includes a load detector 20 for detecting the load imposed on the wheeled platform 1 so that the assisted power can be adjusted according to the load. The use of the load detector 20 is particularly advantageous in that the necessity of the increased or decreased external force to be applied to the handle 4 when the power-assisted cart 10 is desired to be moved with the load imposed or not imposed thereon, respectively, can be eliminated, enabling the operator to apply a constant external force to the handle 4 regardless of the presence or absence of the load. The control flow for this purpose is shown in FIG. 24B. It is, however, to be noted that arrangement may be made such that when no load is imposed the capability of the power-assisted feature may be disabled, but only when the load is imposed the power-assisted feature may be enabled.

Figure 25:
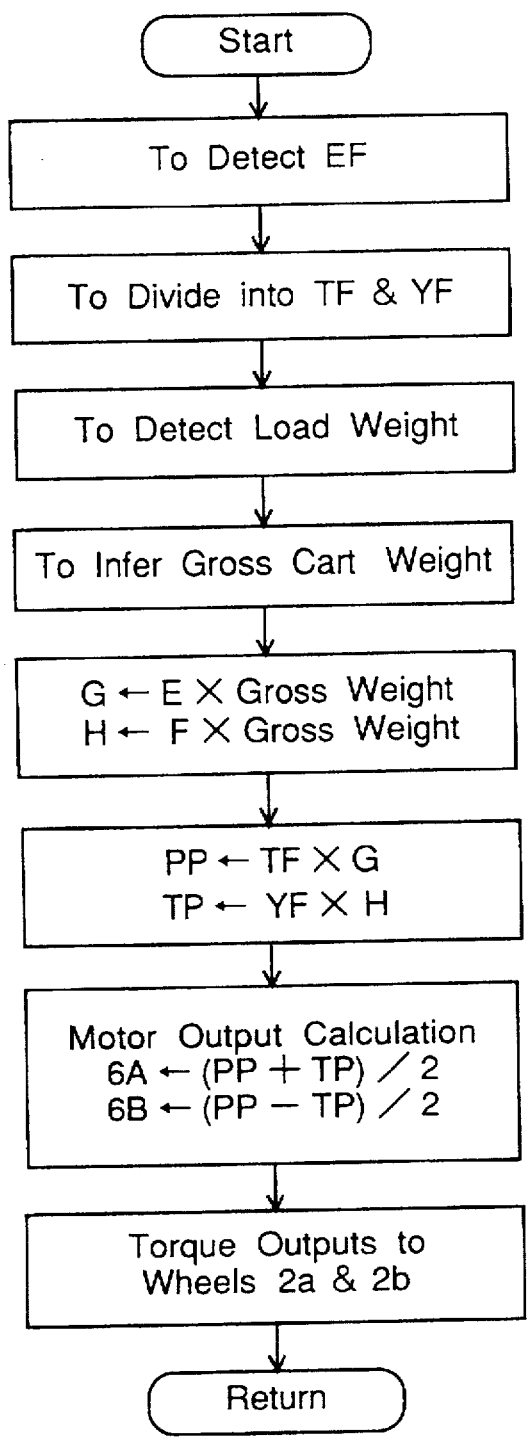
FIG. 25 is a diagram showing an alternative flow of control executed in the power-assisted cart according to the fourth embodiment of the present invasion.

If the load detector 20 is of a type operable to measure the weight of the load placed on the wheeled platform 1 and then to output a weight signal indicative of the weight of the load, the control flow requires modification as shown in FIG. 25. In this control flow shown in FIG. 25, the amplification factor appropriate to the gross cart weight is utilized to calculate the assisted power and, accordingly, even though the weight of the load to be placed on the wheeled platform 1 is not fixed, the maneuverability of the power-assisted cart 10 will not vary considerably. In this modification, the load detector 20 may be placed on a surface of the wheeled platform 1 on which the load is placed.

Figure 26:
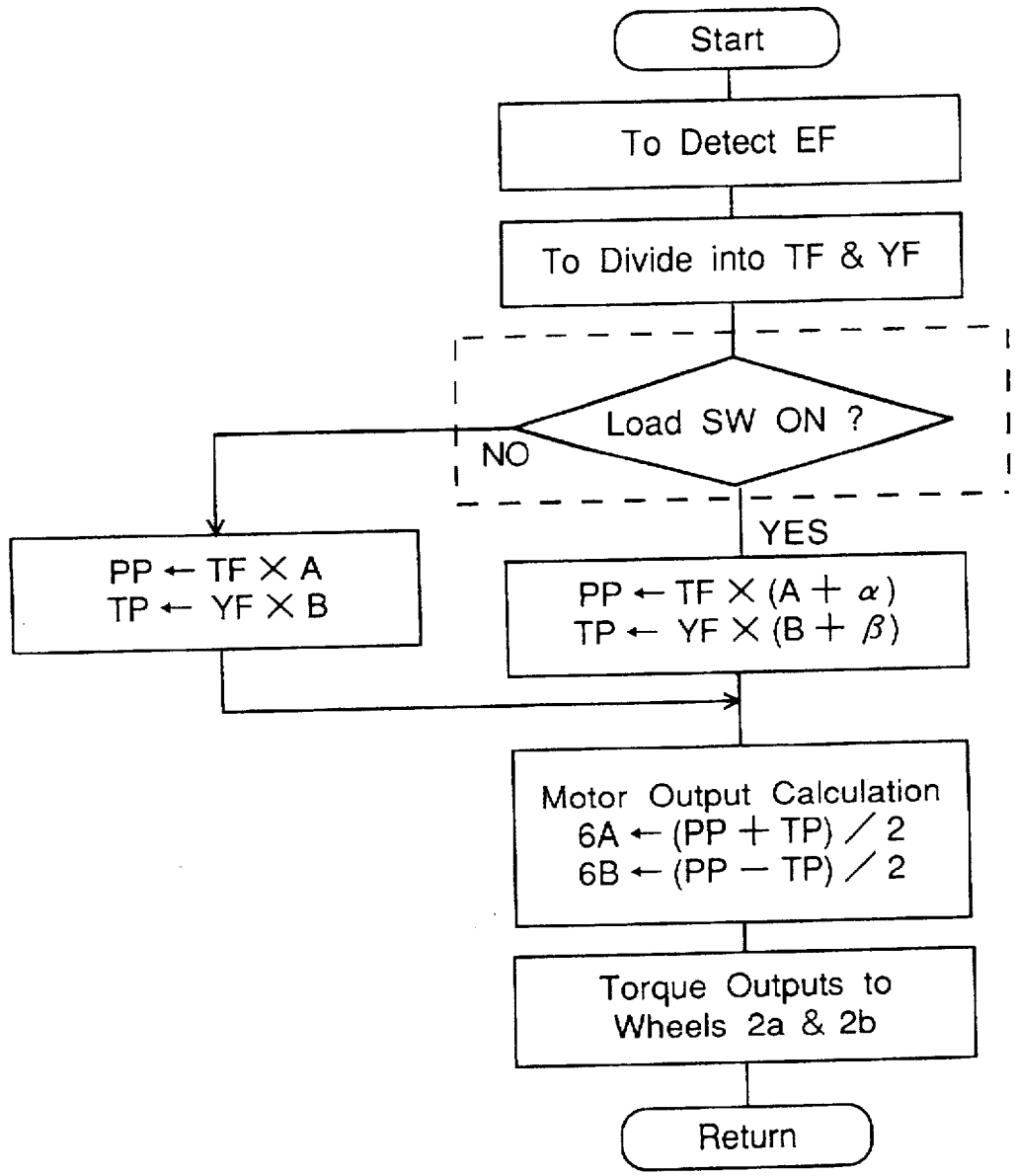
FIG. 26 is a diagram showing a flow of control executed in the power-assisted cart according to a first modification of the fourth embodiment of the present invention.

Modification 1

Where the load to be carried on the power-assisted cart 10 is fixed, the load detector 20 employed in the power-assisted cart 10 may be in the form of a switch capable of generating a signal indicative of the presence or absence of the load as shown in FIG. 26. More specifically, a photo-electric switch may be arranged on the surface of the wheeled platform 1 where the load is to be placed so that it can be switched on upon placement of the load thereon, but off upon removal of the load therefrom. Depending on the presence or absence of the load on the wheeled platform 1, as shown in FIG. 26, a predetermined constant α or β is added to the amplification factor A in calculating the assisted power. In such case, the cost associated with the load detector 10 can be reduced advantageously.

Modification 2

Figure 27:
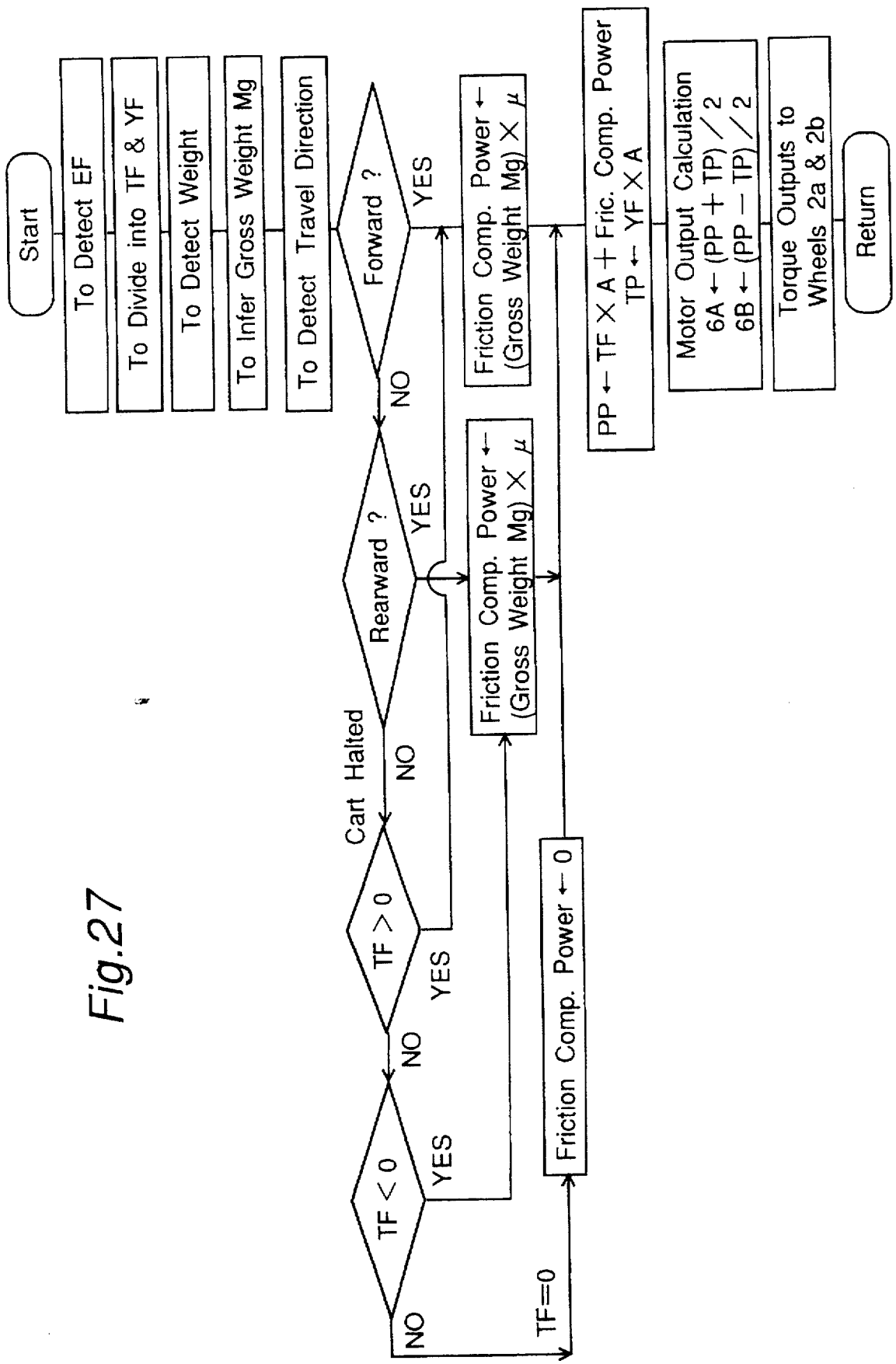
FIG. 27 is a diagram showing a flow of control executed in the power-assisted cart according to a second modification of the fourth embodiment of the present invention.

Considering that the previously discussed frictional resistance varies with the weight of the load, correction of the assisted power in reference to the frictional resistance may be carried out by determining the weight of the load. FIG. 27 illustrates the control flow for this purpose and, as shown therein, a friction compensating force is calculated on the basis of the direction of movement and the gross weight and is then added to the assisted power.

Fifth Preferred Embodiment (FIGS. 28 to 31)

Figure 28:
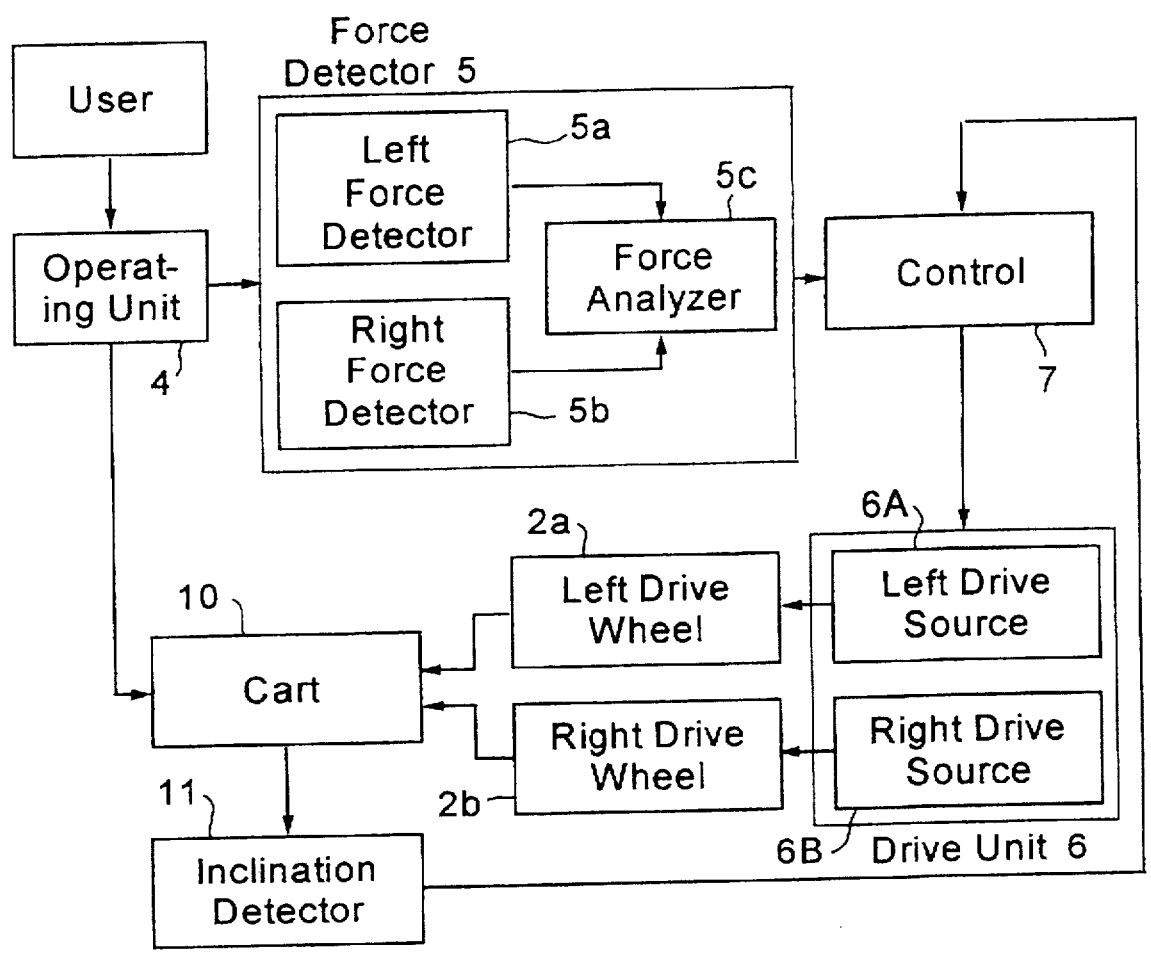
FIG. 28 is a block diagram showing the driving system employed in the power-assisted cart according to a fifth preferred embodiment of the present invention.
Figure 29:
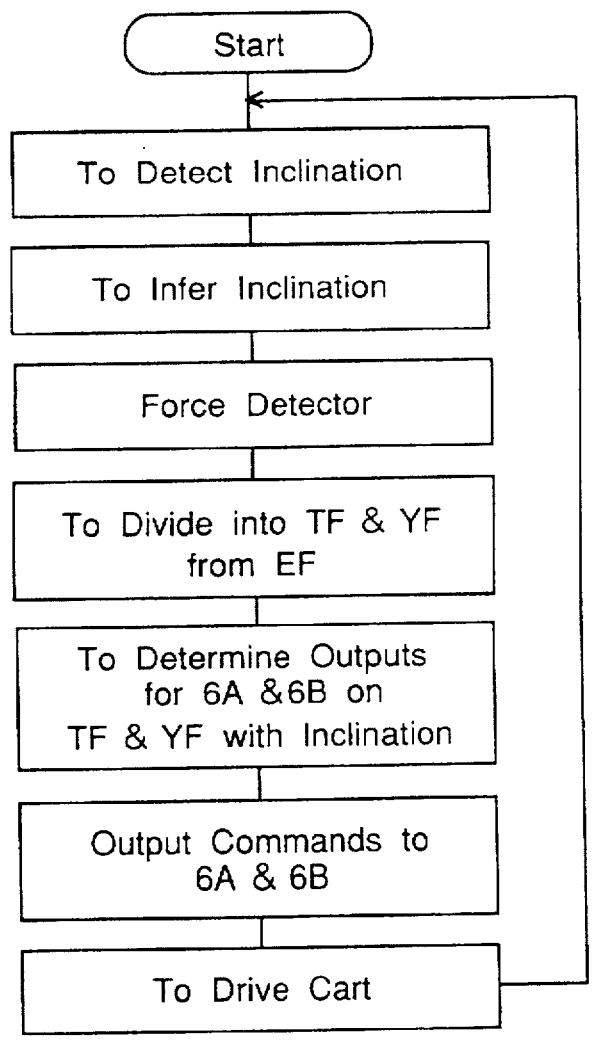
FIG. 29 is a diagram showing a flow of control executed in the power-assisted cart according to the fifth embodiment of the present invention.

A fifth preferred embodiment of the present invention shown in FIGS. 28 and 29 makes use of an inclination detector 11 for detecting an inclination of the power-assisted cart 10 with respect to the direction of travel thereon along a ground surface, that is, whether the power-assisted cart 10 is ascending or descending a slope to determine the angle of inclination. Based on the information provided by the inclination detector 11, the assisted power is corrected. This is particularly advantageous in that there is no possibility that the operator may be burdened with a load which may vary depending on whether the power-assisted cart 10 is ascending the slope, whether the power-assisted cart 10 is descending the slope or whether the power-assisted car 10 is travelling on a flat ground surface.

Figure 31:
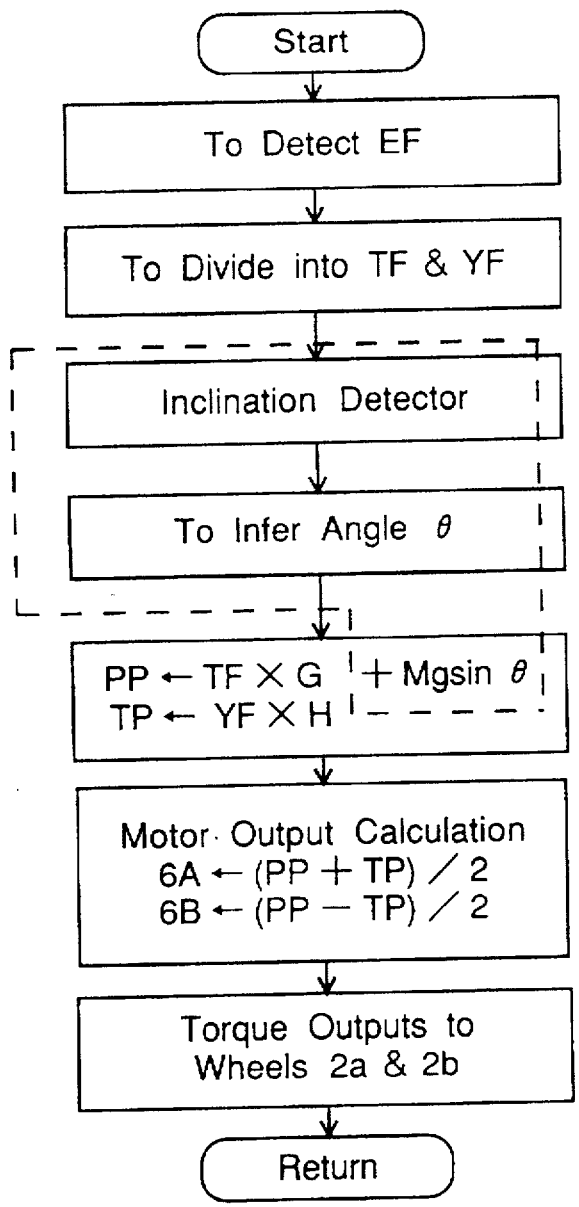
FIG. 31 is a diagram showing a flow of control executed in the power-assisted cart according to the first modification of the fifth embodiment of the present invention.

By way of example, as shown in FIG. 30, assuming that the gross weight of the power-assisted cart 10 is M, the gravitational acceleration is g and the angle of inclination of the ground surface is θ, a diagonally downwardly acting force of M·g·sin θ acts on the power-assisted cart 10 then descending the slope. If, however, as shown in FIG. 31, a force counterbalancing this diagonally downwardly acting force is added to the assisted thrust force determined in dependence on the magnitude of the external force applied to the handle 4, the maneuverability of the power-assisted cart 10 similar to that brought about when the cart 10 is travelling on the flat ground surface can be obtained regardless of whether it descends the slope or whether it ascends the slope. Also, even when the power-assisted cart 10 is parked on the slope, the power-assisted cart 10 will not run unless the external force is applied to the handle 4.

Figure 32:
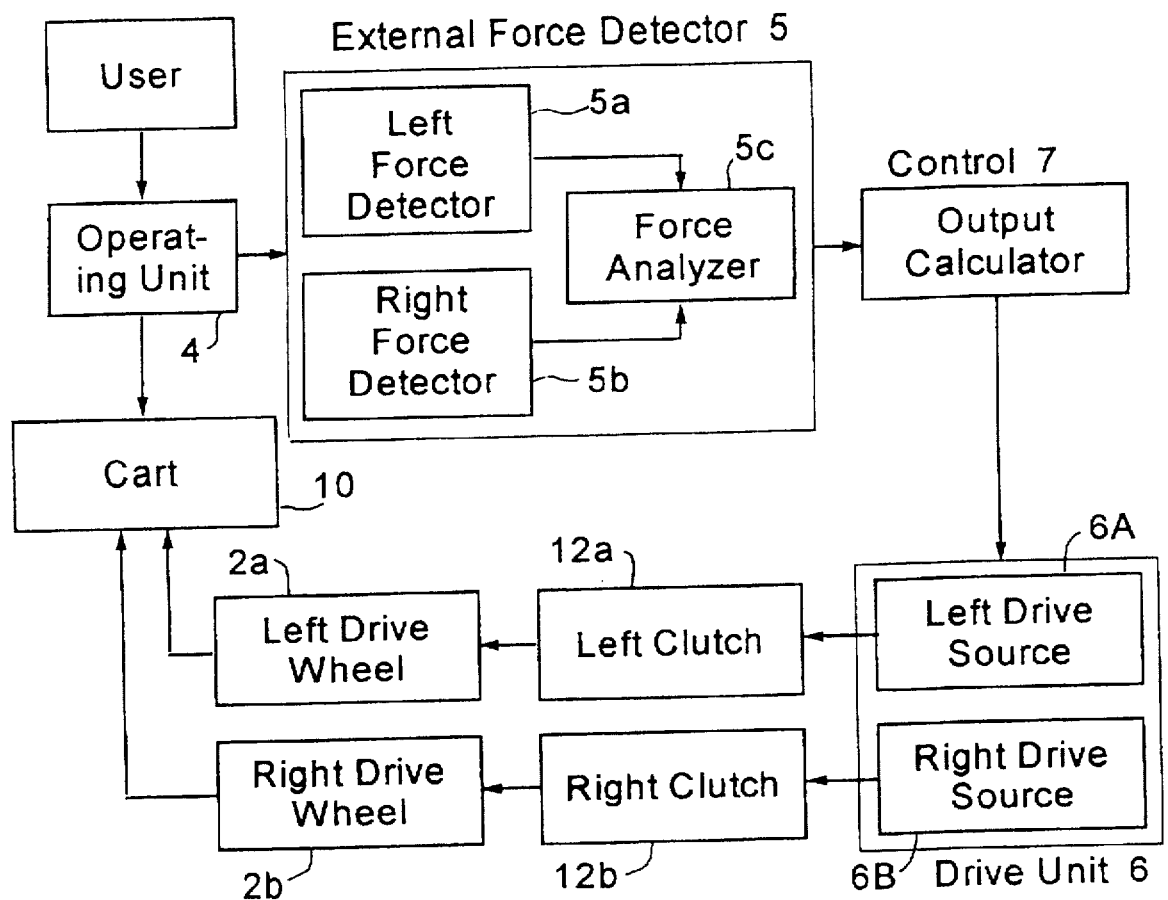
FIG. 32 is a block diagram showing the driving system employed in the power-assisted cart according to a sixth preferred embodiment of the present invention.
Figure 33:
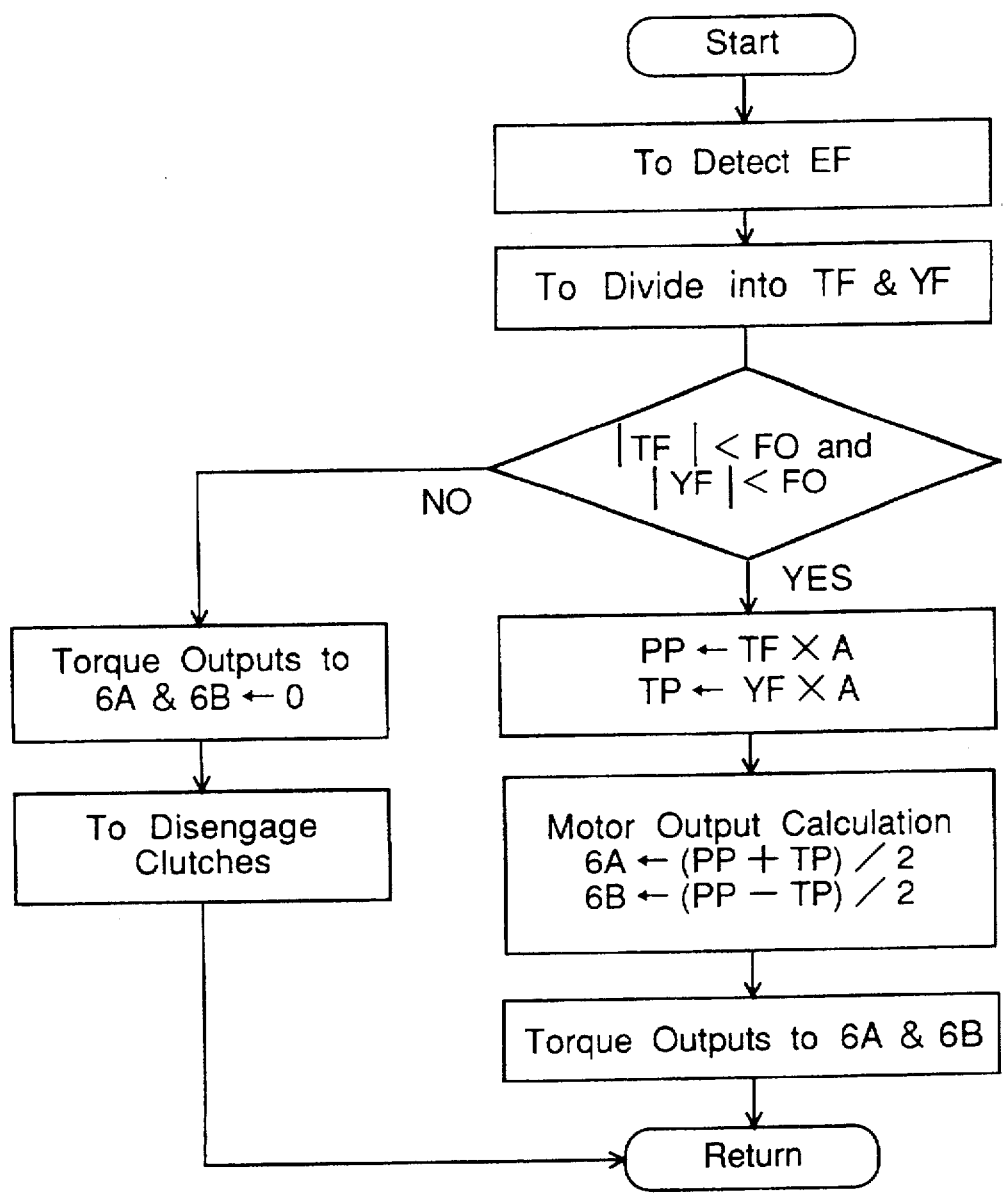
FIG. 33 is a diagram showing a flow of control executed in the power-assisted cart according to the sixth embodiment of the present invention.

Sixth Preferred Embodiment (FIGS. 32 and 33)

According to a sixth preferred embodiment of the present invention shown in FIGS. 32 and 33, left and right clutches 12a and 12b are interposed between the left and right drive sources 6A and 6B and the left and right driving wheels 2a and 2b, respectively. Each of the left and right clutches 12a and 12b is operable to disengage the drive source 6A or 6B from the associated driving wheel 2a or 2b when the external force applied to the handle 4 is extremely small and the assisted power feature is desired to be released. During a constant speed travel the thrust force applied to the handle 4 should be substantially zero, and in such case the power-assisted cart 10 would be considerably decelerated by a resistance of each of the drive sources 6A and 6B. Accordingly, during the constant speed travel, the external force must be applied to the handle 4 at all times. However, the use of the clutches 12a and 12b advantageously eliminates the possibility that the travelling speed may be lowered under the influence of the resistances of the driving sources 6A and 6B.

Force Detecting Device 5

Hereinafter, the details of the force detecting device 5 that can be employed in any one of the foregoing embodiments of the power-assisted cart 10 will be described with reference to FIGS. 34 to 47. According to the present invention, the force detecting device 5 can be embodied in numerous ways and, accordingly, various embodiments thereof are individually described under separate headings each beginning with a legend "Force Detector 5".

Force Detector 5—First Embodiment

Figure 34A:
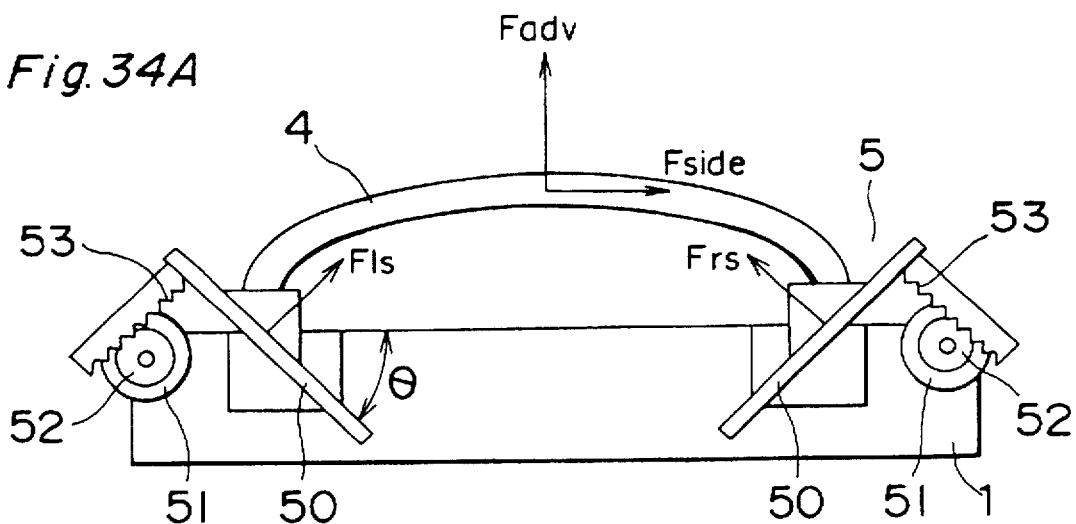
FIG. 34A is a schematic diagram showing a first embodiment of a force detector employed in the power-assisted cart.
Figure 34B:
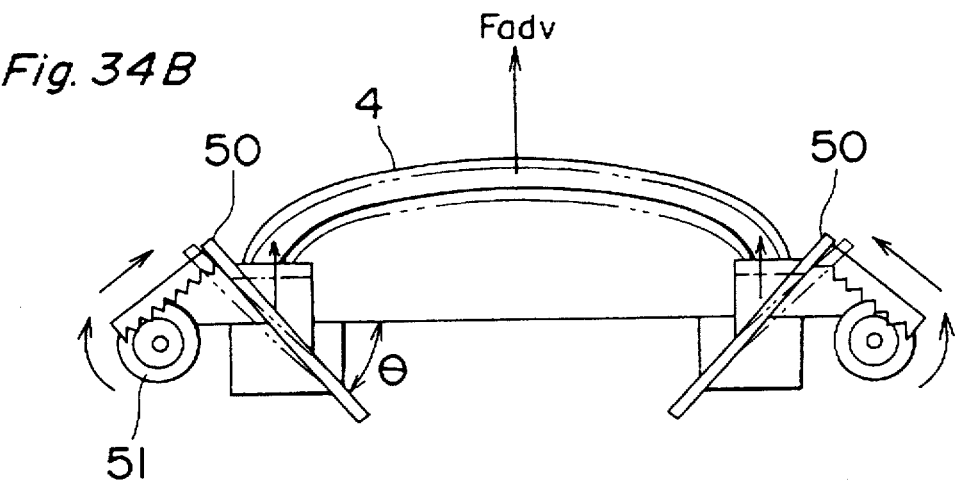
FIGS. 34B and 34C are schematic diagrams showing the force detector of FIG. 34A in different operative positions, respectively.
Figure 34C:
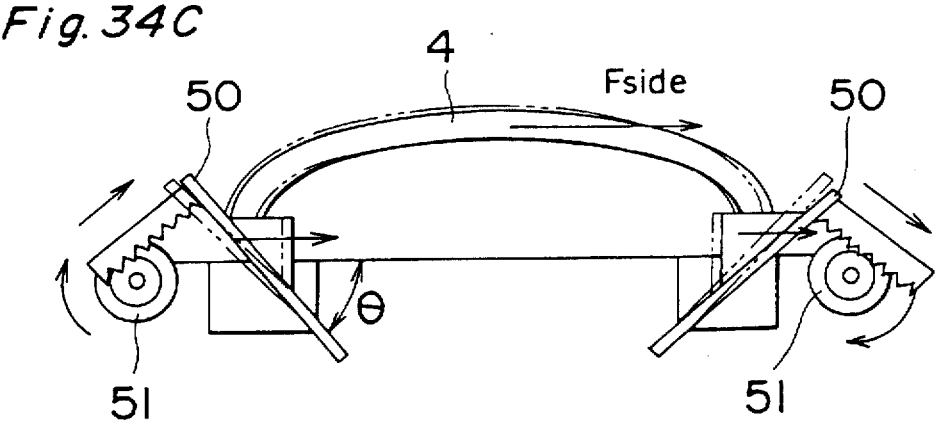
Figure 48:
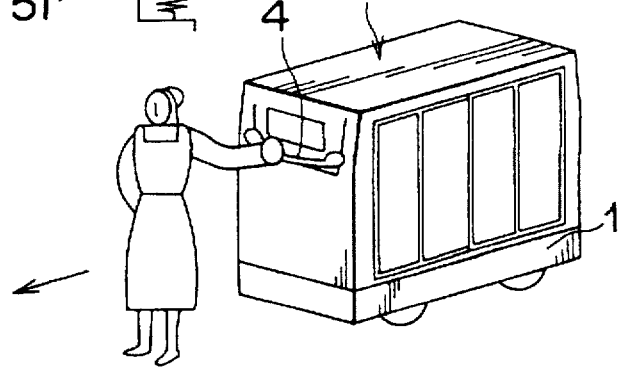
FIG. 48 is a schematic perspective view showing another type of the power-assisted cart according to the present invention.

Referring to FIGS. 34A to 34C, the handle 4 shown therein is of a generally arcuate shape having left and right ends opposite to each other and is shown as applied to a power-assisted delivery cart of a kind shown in FIG. 48 with the opposite ends secured through the force detecting device 5 to left and right portions of a front end wall of a box on the wheeled platform. The power-assisted delivery cart shown therein moves forwards when the operator pushes or pulls the handle 4 by the application of the external force EF discussed hereinbefore.

More specifically, the left and right ends of the handle 4 are operatively coupled with respective leaf springs 50 which are in turn connected at one end with the front end wall of the box on the wheeled platform. The leaf springs 50 so secured to the front end wall extend therefrom in a forward direction so as to diverge outwardly while forming a respective angle θ of inclination relative to a plane of the front end wall. The leaf springs 50 have respective free end portions formed with rack gears 53 which are drivingly engaged with associated pinion gears 52 mounted on corresponding potentiometer 51.

In this construction, if a pulling force Fadv is applied to the handle 4, the leaf springs 50 are deformed in the same direction from a position shown by the phantom lines to a position shown by the solid lines as shown in FIG. 34B, causing the potentiometer 51 to rotate in respective directions counter to each other. Accordingly, respective magnitudes of force acting on the leaf springs 50 can be measured based on respective amounts of turn of the potentiometer 51.

On the other hand, if a steering force Fside is applied to the handle 4 to turn the power-assisted cart 10 sidewise, the left and right leaf springs 50 are deformed in respective directions counter to each other as shown in FIG. 34C, causing the potentiometer 51 to rotate in the same direction. If respective magnitudes of force acting on the left and right leaf springs 50 are expressed by Fls and Frs, the pulling force Fadv and the steering force Fside and the forces Fls and Frs have such a relationship as expressed by the following equation and, accordingly, based on the magnitudes of the forces Fls and Frs acting on the left and right leaf springs 50 as measured by the associated potentiometer 51, the pulling force Fadv and the steering force Fside can be detected.

$$\begin{pmatrix} Fadv \\ Fside \end{pmatrix} = \begin{pmatrix} 1/\cos\theta & 1/\cos\theta \\ -1/\sin\theta & 1/\sin\theta \end{pmatrix} \begin{pmatrix} Fls \\ Frs \end{pmatrix} \quad (1)$$

It is to be noted that, in place of the potentiometer 51, a non-contact display sensor may be employed for measuring displacement of each of the leaf springs 50.

Force Detector 5—Second Embodiment

Figure 35A:
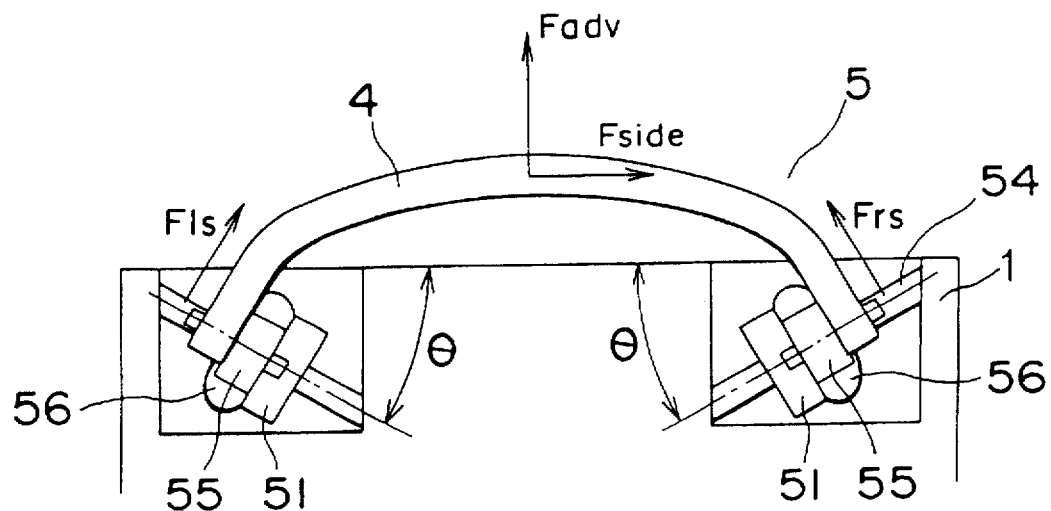
FIG. 35A is a schematic diagram showing a second embodiment of the force detector.
Figure 35B:
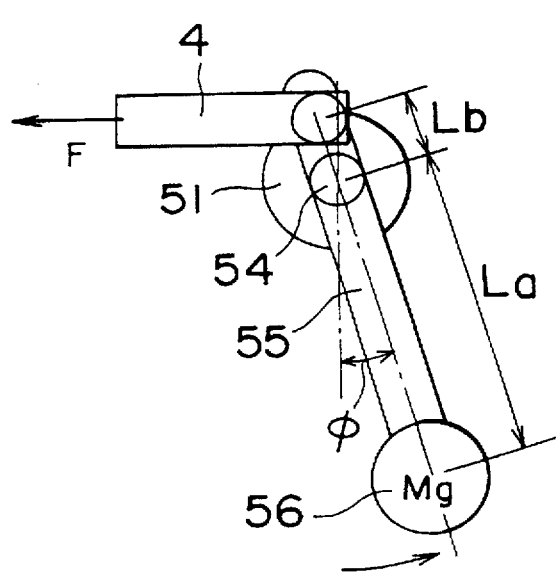
FIGS. 35B and 35C are schematic diagrams showing the force detector of FIG. 35A in different operative positions, respectively.
Figure 35C:
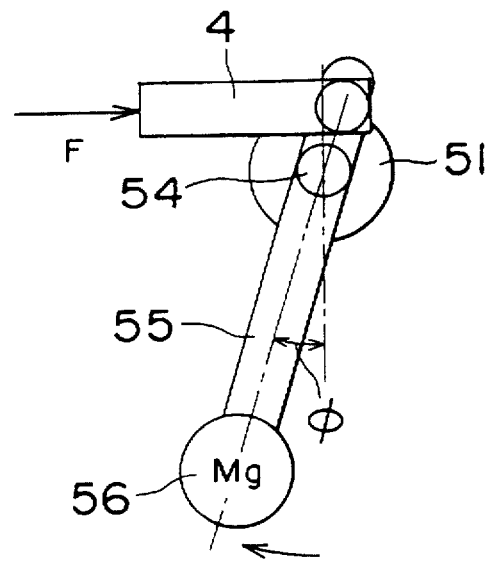

Referring to FIGS. 35 and 36, the force detector 56 comprises, as best shown in FIGS. 35B and 35C, left and right pendulums 55 pivoted at one end to the left and right portions of the front end wall of the cart box through respective support pins 54, each of said pendulums 55 having a free end provided with a weight 56. The left and right ends of the handle 4 which are slightly elastically deformable are coupled with the associated pendulums 55 so that when the handle 4 is pulled as shown in FIG. 35B or pushed as shown in FIG. 35C, the pendulums 55 can swing about the support pins 54. Each of the left and right potentiometer 51 serves to detect the angle of swing of the associated pendulum 55. Thus, it is clear that by detecting the respective angles of swing of the pendulums 55, the respective magnitude of force applied to the pendulums 55 through the handle 4 can be measured. It is to be noted that each of the support pins 54 is supported by the front end wall of the cart box so as to form a predetermined angle θ relative to the plane of the front end wall.

Figure 36A:
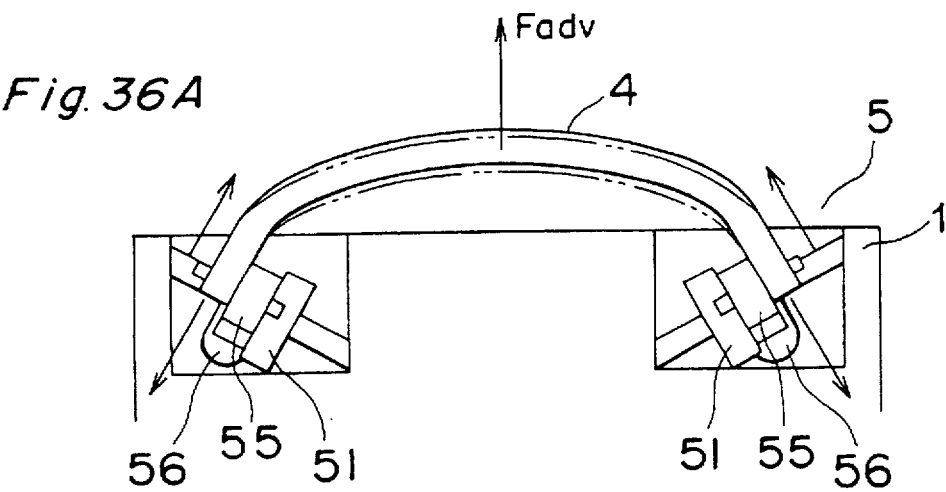
FIGS. 36A and 36B are schematic diagrams corresponding respectively to FIGS. 35B and 35C, showing how the force detector of FIG. 35A operates.
Figure 36B:
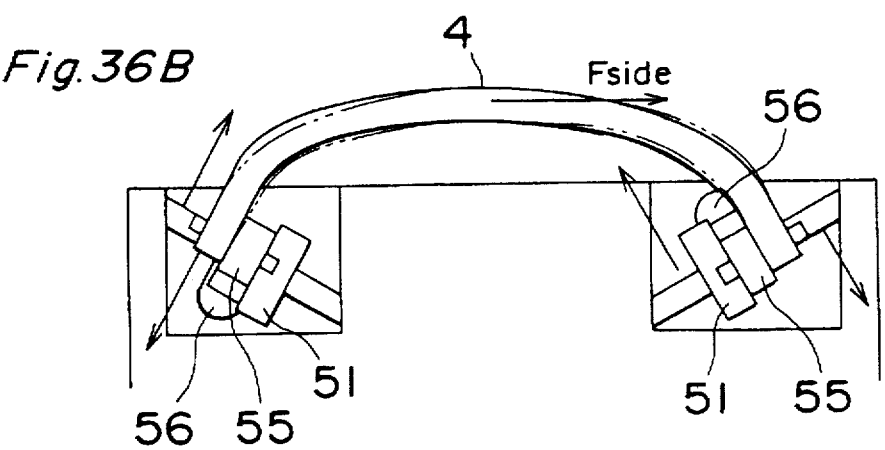

In this construction, if a pulling force Fadv is applied to the handle 4, the pendulums 55 swing in the same direction as shown in FIG. 36A, but if a steering force Fside is applied to the handle, the pendulums 55 swing in respective directions counter to each other as shown in FIG. 36B. Also, each of the pendulums 55 is halted at an angle φ at which the force acting on the respective pendulum 55 counterbalances the gravitational force acting on the associated weight 56 as shown in FIGS. 35B and 35C. By way of example, assuming that the distance between each support pin 54 and the associated weight 56 is expressed by La, the distance between the support pin 54 and the point of connection of the associated pendulum 55 with the adjacent end of the handle 4 is expressed by Lb, the mass of the associated weight 56 is expressed by M, and the gravitational acceleration is expressed by g, the magnitude F of the applied force can be calculated according to the following equation:

$$F \cdot Lb \cdot \cos\phi = M \cdot g \cdot \tan\phi \cdot La \cdot \cos\phi \therefore F = M \cdot g \cdot La \cdot \tan\phi / Lb \quad (2)$$

If while M=1 kg, θ=30°, La=100 mm and Lb=20 mm the pendulums 55 are swung the angle, φ=5°, the force F measured will be about 4.3N.

Based on the magnitudes of the forces Fls and Frs detected by the respective potentiometer 51, the pulling force Fadv and the steering force Fside both contained in the external force applied to the handle 4 can be detected. It is to be noted that even in the embodiment shown in FIGS. 35 and 36, the equation (1) discussed hereinbefore equally applies with respect to the relation between the forces Fadv and Fside and the forces Fls and Frs.

Figure 37A:
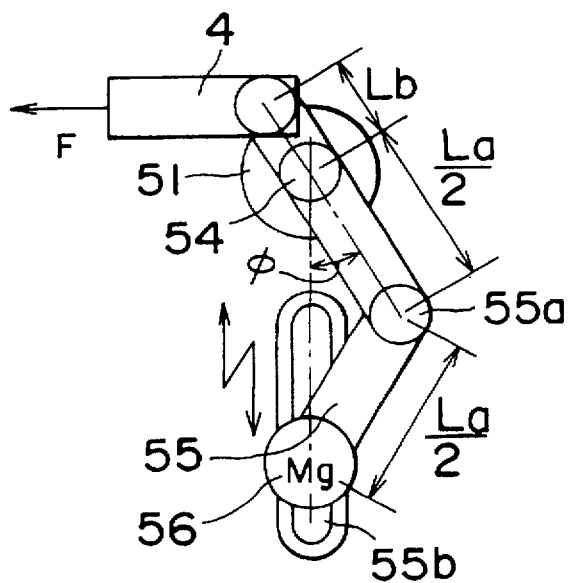
FIGS. 37A and 37B are schematic diagrams showing a modification of the force detector of FIG. 35A in different operative positions, respectively.
Figure 37B:
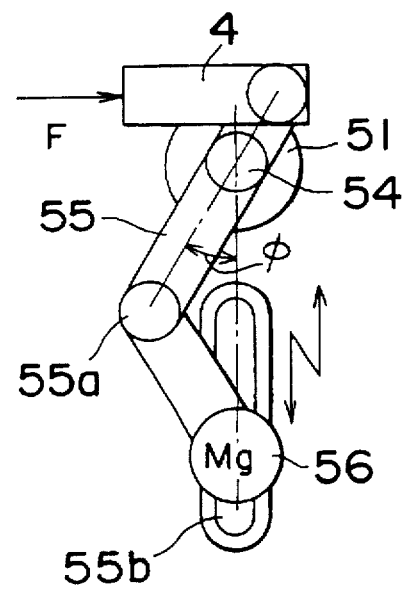
Figure 38A:
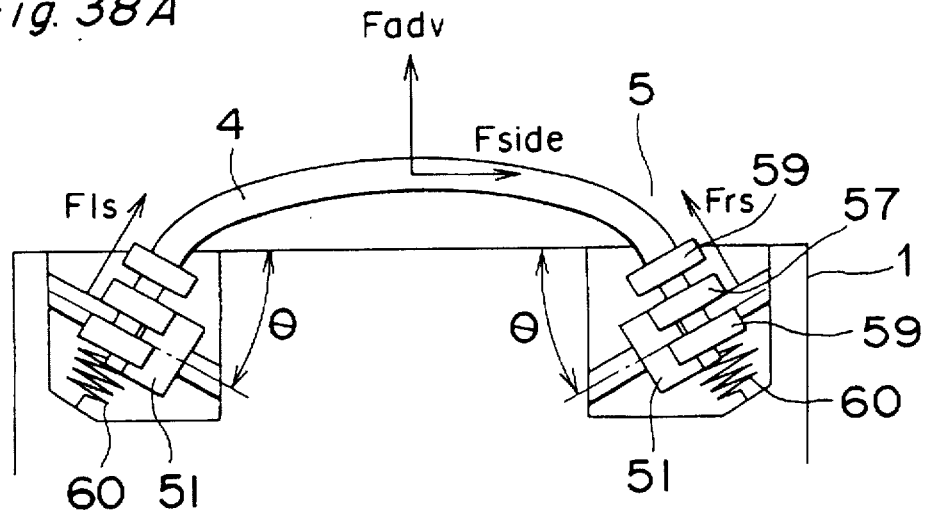
FIG. 38A is a schematic diagram showing a third embodiment of the force detector.
Figure 38B:
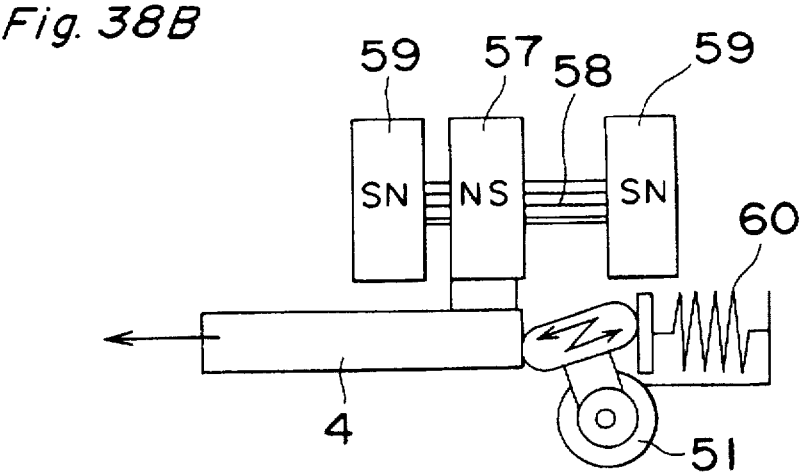
FIGS. 38B and 38C are schematic diagrams showing the force detector of FIG. 38A in different operative positions, respectively.
Figure 38C:
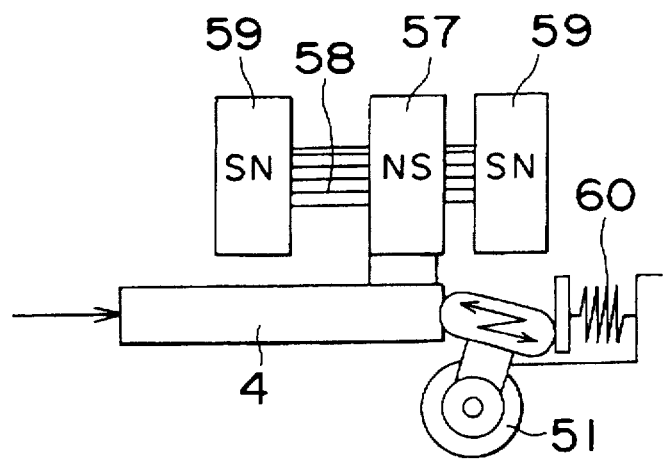

It is to be noted that the space required for each pendulum 55 to swing therein may be reduced if each pendulum 55 is, as shown in FIGS. 37A and 37B, comprised of two pendulum portions pivotally coupled with each other by means of a pivot pin 55a and the respective weight 56 is supported for movement guided by a guide slot 55b. According to this modification, the force detector 5 can be assembled compact in size. force Detector 5—Third Embodiment Referring to FIGS. 38 and 39, a movable body 57 in the form of a permanent magnet slidably mounted on a guide 58 extending a predetermined angle θ relative to the plane of the front end wall of the cart box is arranged at the left and right portions of the front end wall of the cart box. The movable bodies 57 are operatively coupled with the left and right ends of the handle 4, respectively, and two permanent magnets 59 capable of exerting a magnetic force repelling the movable body 57 are disposed on respective sides of each movable body 57. Each potentiometer 51 are utilized to detect the position of the associated movable body 57 along the corresponding guide 58. Reference numeral 60 represents a return spring.

Figure 39A:
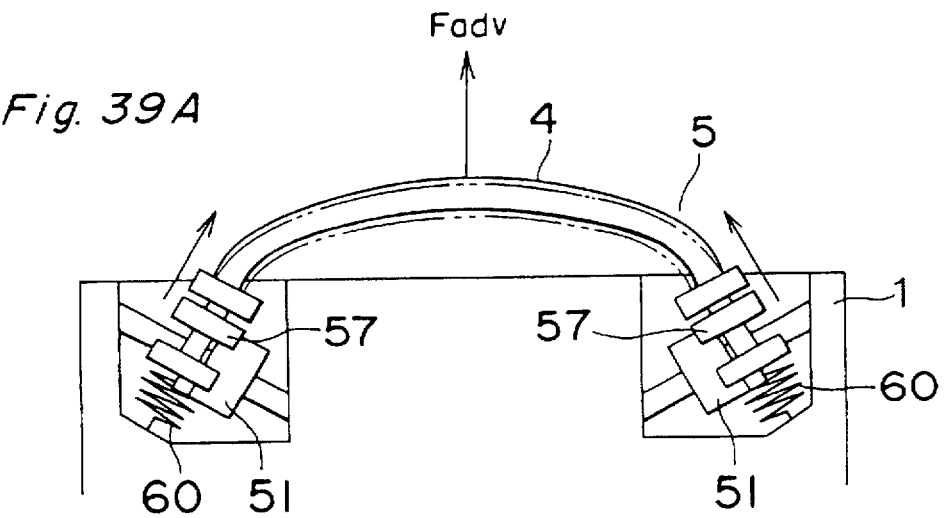
FIGS. 39A and 39B are schematic diagrams showing the force detector of FIG. 38A in different operative positions, respectively, as viewed from a different angle.
Figure 39B:
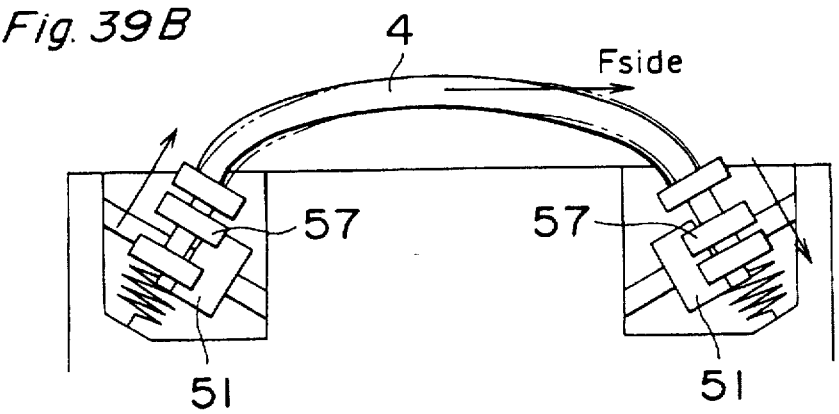

Based on the relationship between the respective amount of displacement of the movable bodies 57 detected by the potentiometer 51 and the magnitudes of magnetic forces acting between the permanent magnets 59 and the movable bodies 57, the magnitude of the force applied to the handle 4 can be determined and, based on the difference between the amount of displacement of the left movable body 57 and that of the right movable body 57, the pulling force Fadv and the steering force Fside both contained in the external force applied to the handle 4 can be detected. FIG. 39A illustrates the handle 4 being applied with the pulling force Fadv and FIG. 39B illustrates the handle 4 being applied with the steering force Fside.

Force Detector 5—Fourth Embodiment

Figure 40:
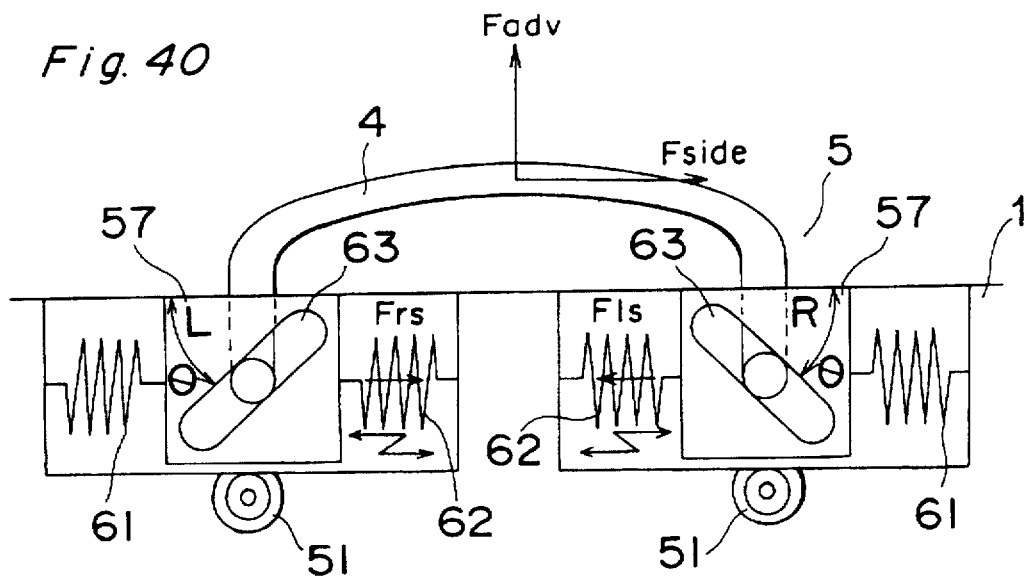
FIG. 40 is a schematic diagram showing a fourth embodiment of the force detector.

The fourth embodiment of the force detector 5 is shown in FIGS. 40 to 41. This force detector 5 includes left and right movable bodies 57 each movable in a direction widthwise of the cart box along the front end wall thereof and regulated in position by springs 61 and 62, and potentiometer 51 for measuring the respective positions of the movable bodies 57. The left and right ends of the handle 4 are slidably engaged in respective grooves 63 inclined so as to converge at a point exteriorly of the cart box. Where the potentiometer 51 are arranged below the movable bodies 57, the resultant force detector 5 can have a reduced size as measured in a direction from the front end wall to the opposite rear end wall and, therefore, the force detector 5 can easily be secured to the cart body.

Figure 41A:
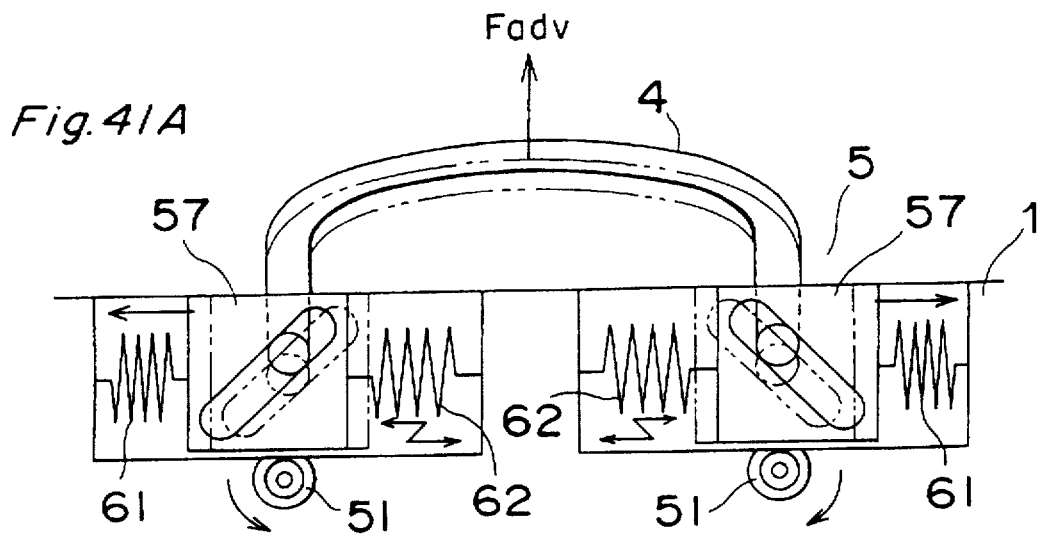
FIGS. 41A and 41B are schematic diagrams showing the force detector of FIG. 40 in different operative positions, respectively.
Figure 41B:
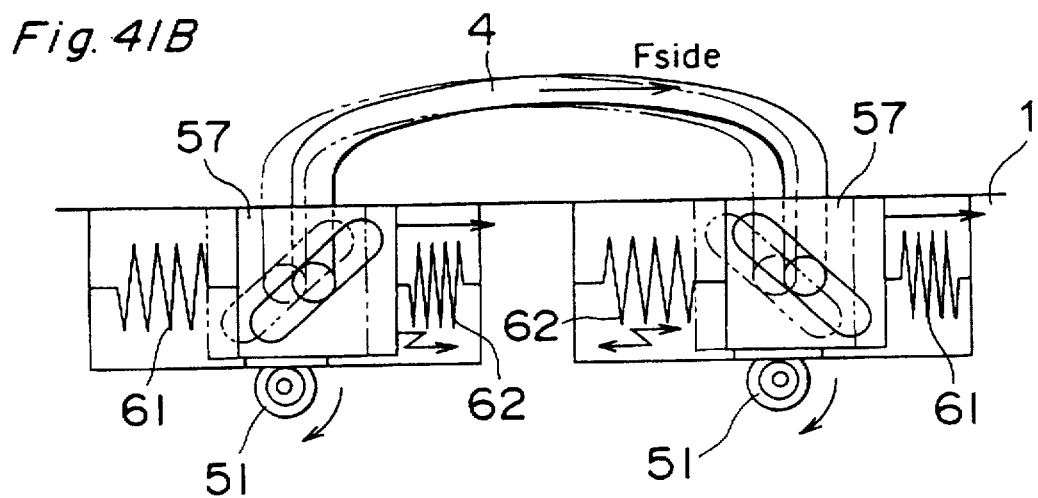

In this construction, if the force Fadv is applied to the handle 4, as shown in FIG. 41A, the movable bodies 57 move in respective directions opposite to each other a distance proportional to the magnitude of the applied force, but if the steering force Fside is applied thereto, as shown in FIG. 41B, the movable bodies 57 move in the same direction a distance proportional to the magnitude of the applied force.

Accordingly, if the magnitudes of the forces Fls and Frs acting on the movable bodies 57 are determined based on the amounts of displacement thereof and the spring forces of the springs 61 and 62, the pulling force Fadv and the steering force Fside both contained in the external force applied to the handle 4 can be detected. At this time, the relationship between the forces Fls and Frs and the forces Fadv and Fside can be expressed by the following equation, provided that each of the grooves 63 is inclined at an angle θ of 45°.

$$\begin{pmatrix} Fadv \\ Fside \end{pmatrix} = \begin{pmatrix} -1 & -1 \\ 1 & -1 \end{pmatrix} \begin{pmatrix} Fls \\ Frs \end{pmatrix} \quad (3)$$

Force Detector 5—Fifth Embodiment

Figure 42A:
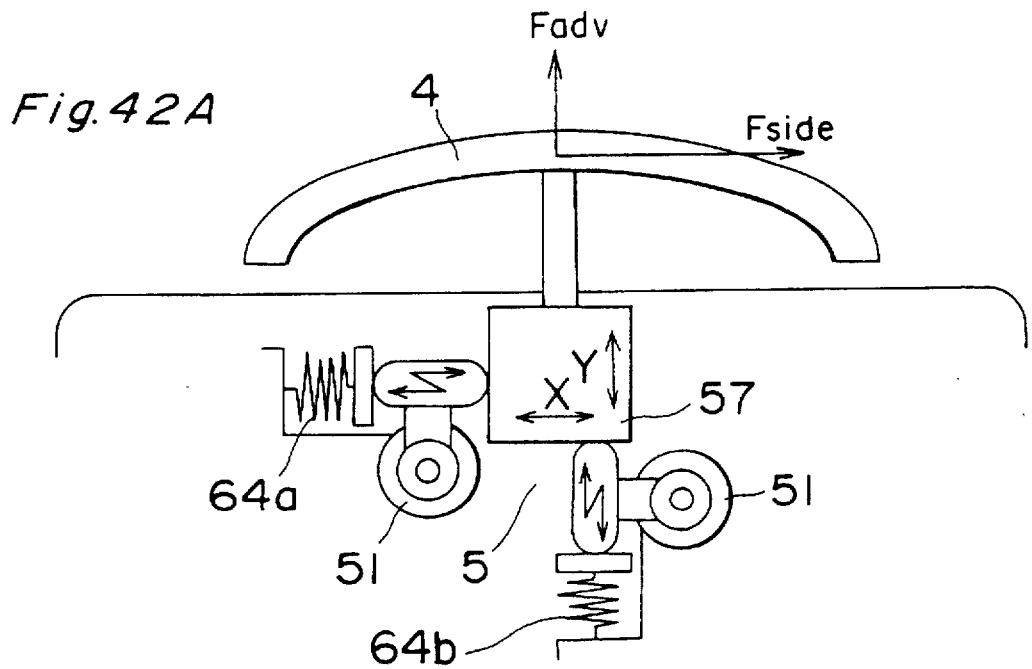
FIG. 42A is a schematic diagram showing a fifth embodiment of the force detector.
Figure 42B:
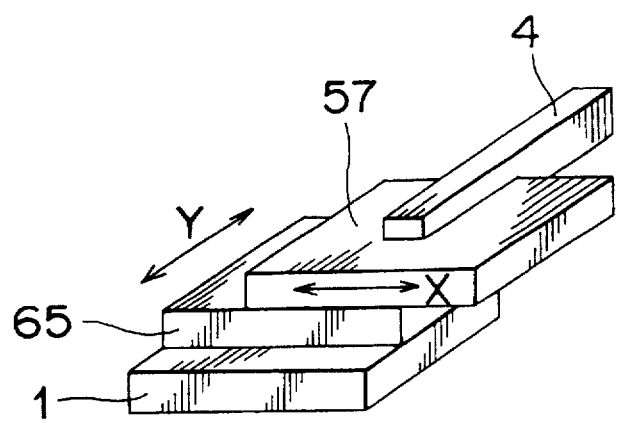
FIG. 42B is a schematic perspective view showing a support structure employed in the force detector of FIG. 42A.

The force detector 5 shown in FIGS. 42 and 43 includes a single movable body 57 movable in two directions parallel and transverse to the longitudinal axis of the power-assisted cart 10, and transverse and longitudinal springs 64a and 64b for applying a resistance to movement of the movable body 57 in any one of the directions. As shown in FIG. 42B, the movable body 57 is supported by a slider 65 for movement in a direction transverse to the longitudinal axis of the wheeled platform 1, said slider 65 being in turn slidably mounted on the wheeled platform 1 for movement in a direction longitudinally of the power-assisted cart 10. This support system resembles to a so-called X-Y table. Potentiometer 51 are employed to detect the position of the movable body 57 in a direction longitudinally of the wheeled platform 1 and the position of the movable body 57 in a direction transverse to the longitudinal axis of the wheeled platform 1, respectively.

Figure 43A:
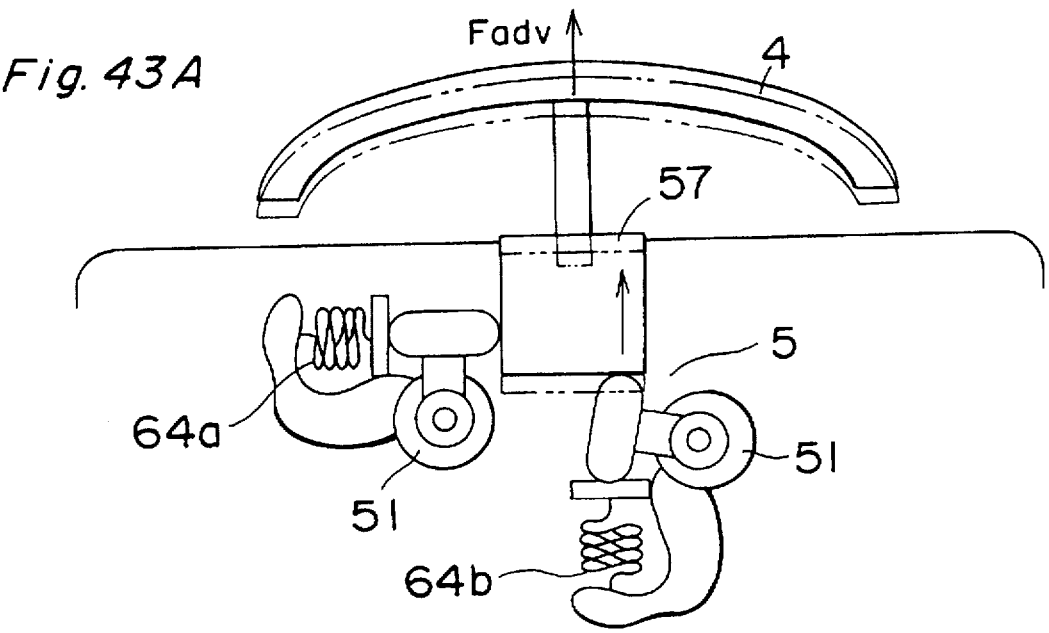
FIGS. 43A and 43B are schematic diagrams showing the force detector of FIG. 42A in different operative positions, respectively.
Figure 43B:
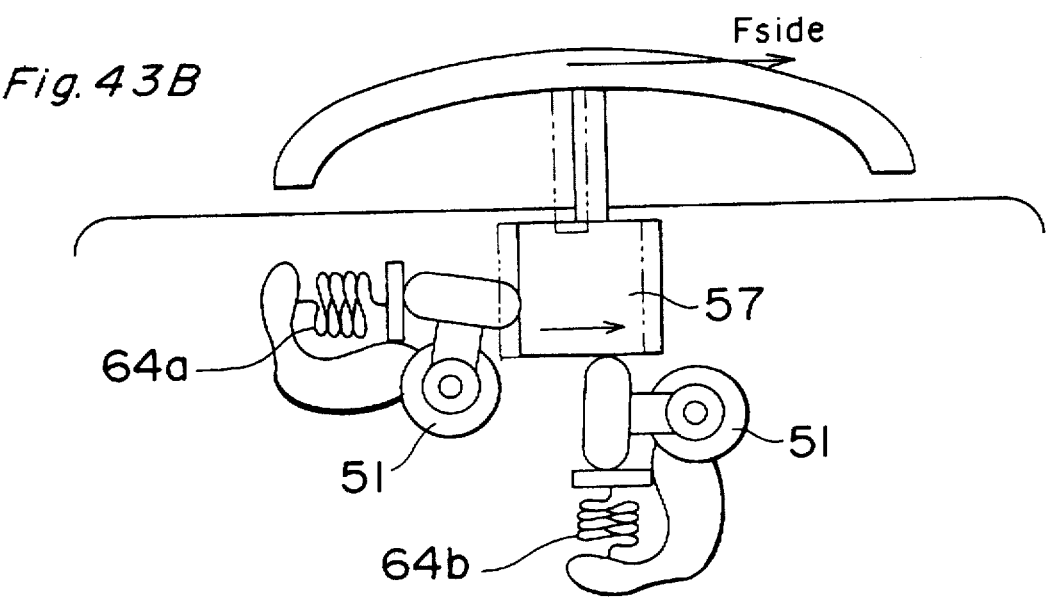

In this construction, when a force is applied to the handle 4, the movable body 57 moves in a manner shown in FIG. 43A or 43B in a direction conforming to the direction in which the force is applied. Since, however, the movement of the movable body 57 is restricted by the springs 64a and 64b, the forces Fadv and Fside applied to the handle 4 can be detected based on the respective amounts of displacement of the movable body 57 in those directions and the respective spring constants of the springs 64a and 64b.

Force Detector 5—Sixth Embodiment

Figure 44A:
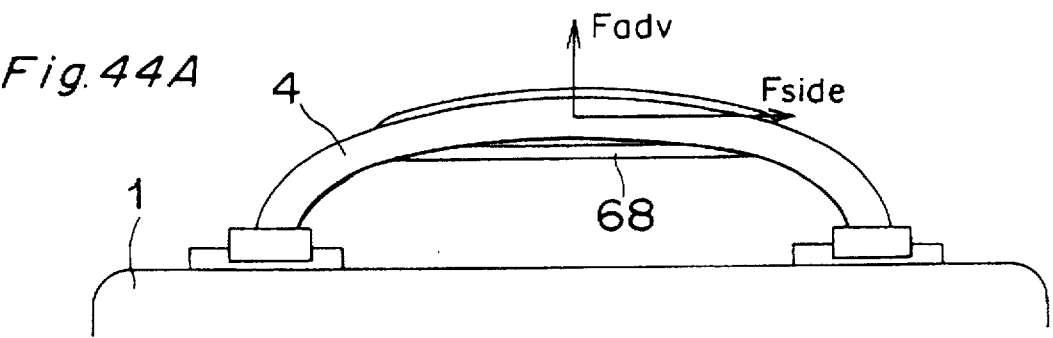
FIG. 44A is a schematic diagram showing a handle incorporating a sixth embodiment of the force detector.
Figure 44B:
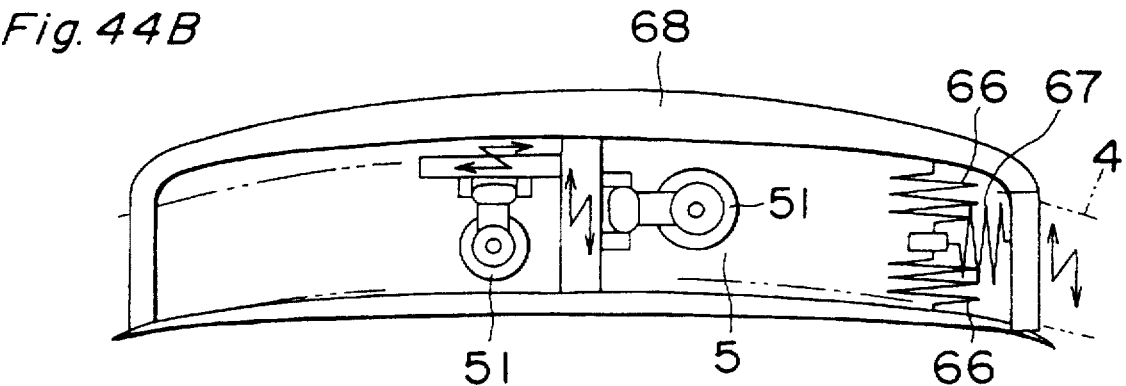
FIG. 44B is a schematic diagram showing the force detector employed in the handle shown in FIG. 44A.
Figure 45A:
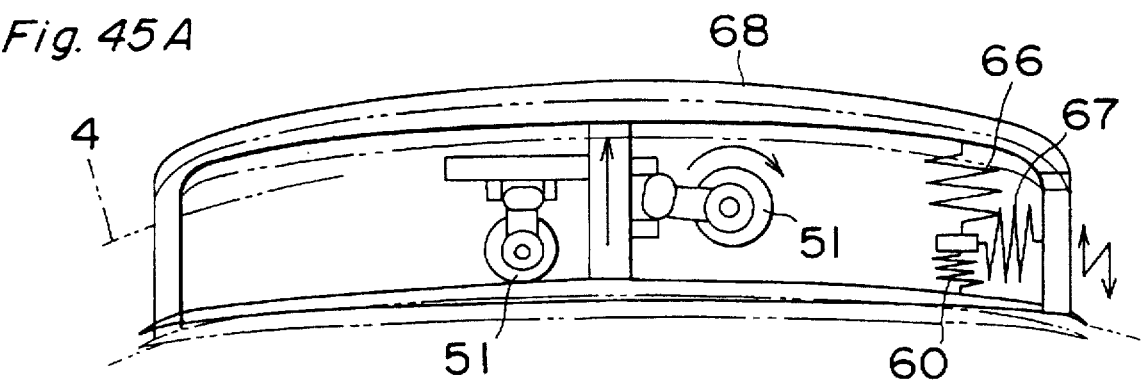
FIGS. 45A and 45B are schematic diagrams showing the force detector of FIG. 44B in different operative positions, respectively.
Figure 45B:
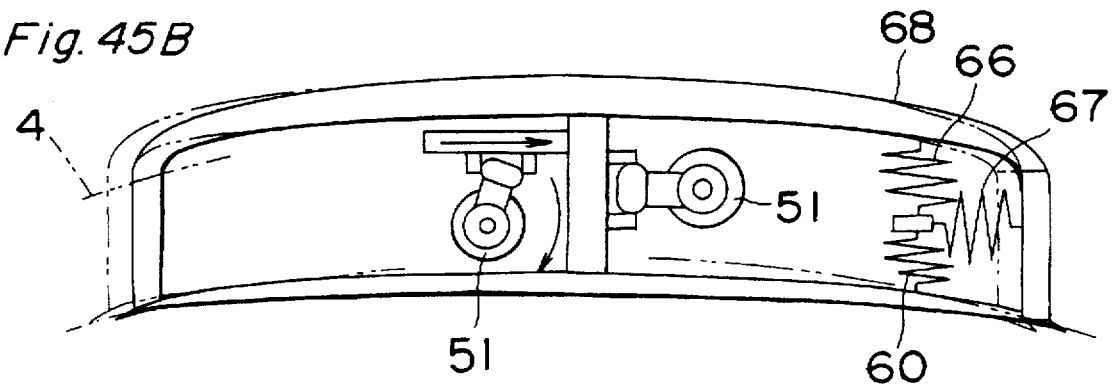

Referring to FIGS. 44 and 45, the handle 4 has a force detector 5 built therein. This force detector 5 includes a lever 68 movable in longitudinal and transverse directions perpendicular to each other relative to the handle 4 while restrained by springs 66 and 67. The lever 68 is so positioned and so designed that when the operator grips the handle 4, the force can be applied to the lever 68. Accordingly, the forces Fadv and Fside applied to the handle 4 can be detected based on the respective amounts of displacement of the lever 68 in those two directions, measured by the respective potentiometer 51, and the amounts of force exerted by the springs 66 and 67. In such case, since the handle 4 itself does undergo any motion, it is possible to achieve a stabilized maneuverability.

Force Detector 5—Seventh Embodiment

Figure 46A:
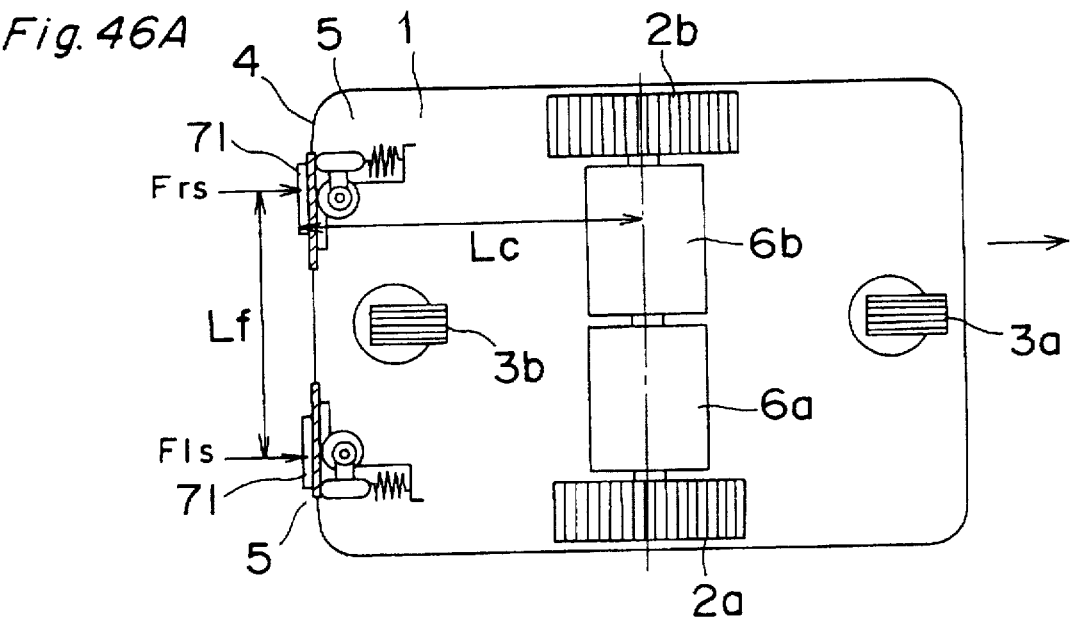
FIG. 46A is a schematic bottom plan view of the power-assisted cart, showing a seventh embodiment of the force detector.
Figure 46B:
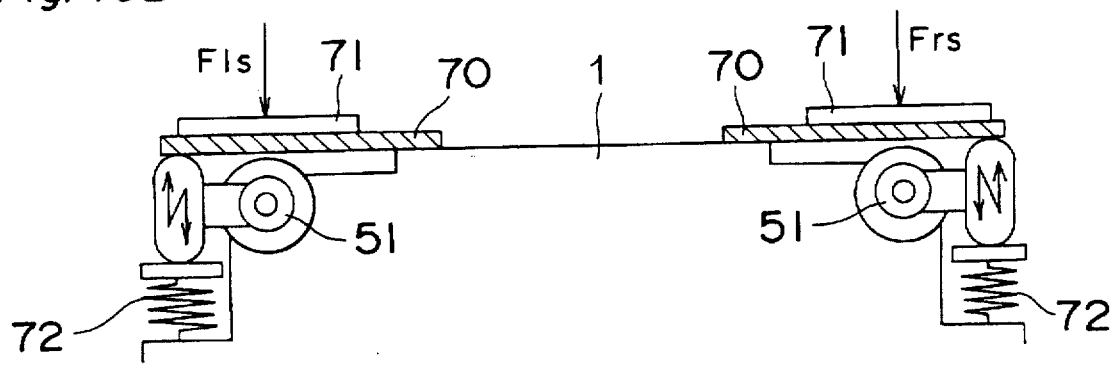
FIG. 46B is a schematic diagram showing the force detector shown in FIG. 46A on an enlarged scale.
Figure 47:
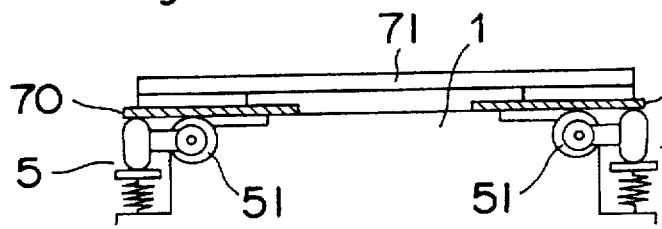
FIG. 47 is a diagram similar to FIG. 48B, showing a modification of the force detector.

In an embodiment of the force detector 5 shown in FIGS. 46 and 47, left and right leaf springs 70 each fixedly connected at one end to the cart box and deformable in a direction conforming to the longitudinal axis of the power-assisted cart 10 have one surface provided with respective operating plates 71. Potentiometer 51 are so used and so disposed as to detect the respective amounts of deformation of the leaf springs 70. The forces Fadv and Fside applied to the operating plates 71 can be detected based on the respective amounts of deformation of the leaf springs 70, measured by the associated potentiometer 51, and the amounts of force exerted by the leaf springs 70. It is to be noted that reference numerals 72 shown in FIG. 46B represent return springs one for each potentiometer 51.

According to the force detector 5 shown in FIGS. 46 and 47, pushing forces should be applied to the operating plates 71 through left and right hands of the operator and, at this time, the force Fadv can be determined based on a composite force of the forces Fls and Frs applied respectively to the operating plates 71. The force Fside can be determined in reference to the difference between the forces Fls and Frs. However, the steering force cannot be detected directly and, therefore, the difference between the forces Fls and Frs is detected as a moment so that the steering force Fside can be determined by the following equation.

$$Fside=\{(Frs-Fls) \cdot Lf/2\}/Lc \quad (4)$$

As shown in FIG. 47, instead of the use of the separate operating plates 71, a single plate may be employed. In either case, while the power-assisted cart 10 can be thrusted only in one direction, nothing exists that may protrude outwardly from the cart box on the wheeled platform 1.

In describing the present invention, the driving wheels 2a and 2b have been shown and described as concurrently serving as the steering wheels, the present invention can be equally applied to a power-assisted cart having driving wheels and steering wheels separate from the driving wheels.

As hereinbefore fully described, the present invention is such that the assisted power proportional to the external force applied to an operating unit can be applied to the driving wheels and the steering wheels and, accordingly, the power-assisted cart can be moved with a force of a magnitude several times the magnitude of the external force applied to the handle. Accordingly, since even the heavy cart can be moved with a slight force and, in addition, it can be moved with the force corresponding to the response the operator may have, the response and the maneuverability are extremely coordinated, allowing the operator to feel comfortable to move and to accomplish a delicate control easily while securing a safety factor.

If at this time the use is made of the driving wheels which concurrently serve as steering wheels and are independently driven and the assisted force proportional to the external force applied in a direction conforming to the direction of travel and the assisted power proportional to the external force applied in a direction in which the cart is turned are applied to the driving wheels, the drive system including a steering system can be simplified in structure. Where the driving wheels are disposed on respective sides of the wheeled platform and positioned intermediate of the length of the wheeled platform and casters are employed at front and rear end of the wheeled platform, the behavior of the power-assisted cart remains the same regardless of the direction in which it travels and, more over, the power-assisted cart can be turned along a minimized sharp turning circle. Also, even though the external force applied acts only in leftward and rightward directions, the power-assisted cart can be moved faithfully to the applied force.

If when the assisted force proportional to the applied external force is to be applied, correction is effected thereto according to the rate of change of the external force, a smooth movement can be obtained at the time of start, stop and climbing over the bump on a road surface, accompanied by an increased maneuverability.

Where the external force applied is extremely small, and if this extremely small external force is neglected, any possible unnecessary movement or any possible uncalled-for movement of the cart can be avoided, making it possible to provide the power-assisted cart robust to noises and capable of running smoothly.

Where the use is made of the speed detector means for detecting the travelling speed of the power-assisted cart so that the assisted power can be corrected according to the travelling speed, change in speed resulting from the applied assisted power can be maintained in a proper condition. In particular, if the assisted power is nulled when the travelling speed exceeds a predetermined value, an excessive increase of the travelling speed can be prevented thereby to avoid any possible run of the cart out of control, ensuring a high safety factor.

Also, if the amplification factor for the assisted power relative to the applied external force is decreased with increase of the travelling speed of the cart, change in speed relative to change in external force when the travelling speed is high can be lessened and, at the same time, the operator touching the operating unit can have a comfortable response from the operating unit.

If correction of the assisted power in dependence on the travelling speed is carried out by adding a viscosity proportional to the travelling speed to the assisted power then calculated as dependent on the external force, a braking similar to an engine brake can be applied when the travelling speed increases, and therefore, the safety factor can be increased when the travelling speed is relatively high.

If correction of the assisted power in dependence on the travelling speed is carried out by adding the rolling resistance that increases with the travelling speed, the power-assisted cart can move smoothly without permitting the operator to feel any possible resistance to run.

Should the static frictional resistance be added when the travelling speed is lower than the extremely low value, the operator can enjoy a feeling that the cart has started smoothly.

Where the inclination detecting means for detecting inclination of the cart is used to detect that the cart descends the slope, the safety factor can be increased by employing the correction in dependence on the travelling speed detected by the speed detecting means. In the case where the driving wheels are of a kind that can be driven independently from each other and the assisted power proportional to the external force applied in a direction conforming to the direction of travel of the cart is applied to each of the driving wheels, when a speed detector is used in association with each of the driving wheel so that the correction of the assisted force appropriate to the travelling speed can be effected for each of the driving wheel, the cart can be maneuvered stably regardless of the road condition.

Particularly if when the difference in speed between the driving wheels is small as compared with the magnitude of the external force applied in a direction conforming to the steering direction the difference between the assisted powers applied respectively to the driving wheels is increased, not only can the turning performance of the cart be increased, but also the cart can be smoothly turned even though the cart is to be turned on the slope or even though a different coefficient of friction exists between the tread of each of the driving wheels and the ground surface.

Conversely, if when the difference in speed between the driving wheels is large as compared with the magnitude of the external force applied in a direction conforming to the steering direction the difference between the assisted powers applied respectively to the driving wheels is decreased, not only can the performance of the cart to run straightforward be increased, but also the cart can be smoothly moved straightforward even though the cart is moved on the slope or even though a different coefficient of friction exists between the tread of each of the driving wheels and the ground surface.

Where the load detecting means is employed so that the assisted power can be corrected in dependence on the load imposed on the cart, in the case there the gross weight varies considerably regardless of the presence or absence of the load, there is no possibility that the force necessary to move the cart will be excessively large or small and the operator can therefore have a comfortable response from the handle.

If the load detecting means is employed in the form of a weight detector capable of outputting a value proportional to the weight of the load on the cart, a delicate correction in dependence on the weight of the load is possible even though the weight of the load is not fixed, thereby providing a satisfactory maneuverability of the cart. Where the weight of the load is fixed at all times, the load detecting means may be of a type capable of outputting a signal indicative of the presence or absence of the load, making it possible to reduce the cost.

Considering that the frictional force which constitutes a resistance to run of the cart varies with the weight of the load on the cart, correction to counterbalance the frictional resistance may be carried out by determining the frictional resistance in dependence on the weight of the load on the cart. By so doing, change in maneuverability resulting from the frictional resistance can advantageously be lessened.

In addition, where an inclination detecting means for detecting the angle of inclination of the cart is used so that the assisted power can be corrected in dependence on the detected angle of inclination, a favorable maneuverability can be obtained regardless of inclination of the slope. In particular, if correction of the assisted power in dependence on the detected angle of inclination is carried out in such a way that a component of force counterbalancing the force acting on the cart to descend the slope can be added, not only can the cart ascending or descending the slope be maneuvered in a manner similar to that moving on a flat road surface, but also the cart will not abruptly start when it is stopped along the slope.

Where a clutch is interposed between each driving wheel and a drive source for driving such driving wheel for disengaging the respective driving wheel from the associated drive source when no external force is applied, a favorable maneuverability during a constant speed travel can be obtained.

Although the present invention has been described in connection with the preferred embodiments thereof with reference to the accompanying drawings, it is to be noted that various changes and modifications are apparent to those skilled in the art. By way of example, although the present invention has been described as applied to a cart of a kind that can be moved by applying a push or pull to the handle while the operator walks following the cart, the present invention can be equally applied to a low-speed electric vehicle with the operator riding thereon. Accordingly, the term "cart" herein used in connection with the present invention is to be construed as including such a vehicle.

Also, while the handle 4 has been shown as mounted on a front end of the platform, two handles may be employed on front and rear ends of the platform, respectively.

In addition, the present invention can also be equally applied to a wheeled cart of a type having no caster.

Accordingly, such changes and modifications are to be understood as included within the scope of the present invention as defined by the appended claims, unless they depart therefrom.

What is claimed is:

1. A power-assisted cart comprising:
   a wheeled platform for supporting a load thereon;
   a first driving wheel mounted on the wheeled platform for, when driven, moving the wheeled platform;
   a drive means for driving the first driving wheel;
   an operating member mounted on the wheeled platform for receiving an external force applied thereto when the cart is desired to be moved;
   a force detector for detecting a magnitude and direction of the external force applied to the operating member to thereby detect thrust and yawing forces applied to the power-assisted cart; and
   a control means for controlling the drive means to apply a torque to the first driving wheel substantially proportional to the external force detected by the force detector so that the external force, when added to a force resulting from the torque applied to the first driving wheel results in a desired total force being applied to the cart.

2. The power-assisted cart as claimed in claim 1, further comprising a change detector for detecting a rate of change of the external force applied to the operating member, and wherein said control means is operable to correct the torque based on the change rate detected by the change detecting means.

3. The power-assisted cart as claimed in claim 1, wherein the control means includes a force sensor for detecting a first range of values of the external force applied to the operating member and, wherein the control means is operable to correct the torque based on the values so detected, and wherein the first range of values include values of the external force which have a magnitude below a threshold level.

4. The power-assisted cart as claimed in claim 1, further comprising speed detecting means for detecting a traveling speed of the power-assisted cart, wherein the control means corrects the torque based on the traveling speed detected by the speed detecting means.

5. The power-assisted cart as claimed in claim 4, wherein the control means is operable to suspend application of torque when the traveling speed detected by the speed detecting means exceeds a predetermined value.

6. The power-assisted cart as claimed in claim 4, wherein the control means utilizes an amplification factor to calculate a desired amount of torque based on the detected external force, wherein, when the torque generated by the drive means is increasing with an increase of the traveling speed detected by the speed detecting means, the control means decreases the amplification factor.

7. A power-assisted cart comprising:
   a wheeled platform for supporting a load thereon;
   a first driving wheel mounted on the wheeled platform for, when driven, moving the wheeled platform;
   a drive means for driving the first driving wheel;
   an operating member mounted on the wheeled platform for receiving an external force applied thereto when the cart is desired to be moved;
   speed detecting means for detecting a traveling speed of the power-assisted cart, wherein the control means corrects the torque based on the traveling speed deteted by the speed detecting means;
   a force detector for detecting a magnitude and direction of the external force applied to the operating member to thereby detect thrust and yawing forces applied to the power-assisted cart; and a control means for controlling the drive means to apply a torque to the first driving wheel substantially proportional to the external force detected by the force detector, wherein the control means includes a viscosity adding means for decreasing the torque by applying a viscous resistance to the drive means, wherein the viscous resistance is substantially proportional to the traveling speed detected by the speed detecting means.

8. The power-assisted cart as claimed in claim 4, wherein the control means includes a resistance adding means for increasing the torque based on a rolling resistance.

9. The power-assisted cart as claimed in claim 4, wherein the control means includes a static friction adding means for increasing the torque based on a static frictional resistance.

10. A power-assisted cart in claim 4, comprising:

a wheeled platform for supporting a load thereon;

a first driving wheel mounted on the wheeled platform for, when driven, moving the wheeled platform;

a drive means for driving the first driving wheel;

an operating member mounted on the wheeled platform for receiving an external force applied thereto when the cart is desired to be moved;

speed detecting means for detecting a traveling speed of the power-assisted cart, wherein the control means corrects the torque based on the traveling speed detected by the speed detecting means;

inclination detecting means for detecting an inclination of the cart, and wherein the control means corrects the torque based on the inclination detected by the inclination detecting means;

a force detector for detecting a magnitude and direction of the external force applied to the operating member to thereby detect thrust and yawing forces applied to the power-assisted cart; and a control means for controlling the drive means to apply a torque to the first driving wheel substantially proportional to the external force detected by the force detector.

11. The power-assisted cart as claimed in claim 4, further comprising a second driving wheel, wherein the first and second driving wheels are independently driven by the driving means, and wherein the first driving wheel is mounted on a left portion of the wheeled platform and the second driving wheel is mounted on a right portion of the wheeled platform, and wherein the speed detecting means detects the speed of each of the first and second driving wheels and the control means independently controls each of the first and second driving wheels.

12. The power-assisted cart as claimed in claim 11, wherein the control means is operable to increase a difference between rotational speeds of the first and second driving wheels when a difference between the rotational speeds of the first and second driving wheels is small as compared to a detected value of the yawing force.

13. The power-assisted cart as claimed in claim 11, wherein the control means is operable to decrease a difference between the torque applied to the first driving wheel and the torque applied to the second driving wheel when a difference in rotational speed between the first and second driving wheels is large as compared with a detected value of the yawing force.

14. The power-assisted cart as claimed in claim 1, further comprising a load detecting means, wherein the control means corrects the torque based on a load value detected by said load detecting means.

15. The power-assisted cart as claimed in claim 14, wherein the load detecting means includes a load sensor for detecting whether a load is present on the wheeled platform.

16. The power-assisted cart as claimed in claim 14, wherein the load detecting means includes a weight sensor for detecting a weight of a load on the wheeled platform.

17. A power-assisted cart comprising:

a wheeled platform for supporting a load thereon;

a first driving wheel mounted on the wheeled platform for, when driven, moving the wheeled platform;

a drive means for driving the first driving wheel;

an operating member mounted on the wheeled platform for receiving an external force applied thereto when the cart is desired to be moved;

speed detecting means for detecting a traveling speed of the power-assisted cart, wherein the control means corrects the torque based on the traveling speed detected by the speed detecting means;

load detecting means, wherein the control means corrects the torque based on a load value detected by said load detecting means, wherein the load detecting means includes a weight sensor for detecting a weight of a load on the wheeled platform;

a force detector for detecting a magnitude and direction of the external force applied to the operating member to thereby detect thrust and yawing forces applied to the power-assisted cart; and a control means for controlling the drive means to apply a torque to the first driving wheel substantially proportional to the external force detected by the force detector, wherein the control means includes a frictional resistance adding means for increasing the torque based on the weight detected by the weight sensor.

18. A power-assisted cart comprising:

a wheeled platform for supporting a load thereon;

a first driving wheel mounted on the wheeled platform for, when driven, moving the wheeled platform;

a drive means for driving the first driving wheel;

an operating member mounted on the wheeled platform for receiving an external force applied thereto when the cart is desired to be moved;

speed detecting means for detecting a traveling speed of the power-assisted cart, wherein the control means corrects the torque based on the traveling speed detected by the speed detecting means;

inclination detecting means for detecting an inclination of the power-assisted cart;

a force detector for detecting a magnitude and direction of the external force applied to the operating member to thereby detect thrust and yawing forces applied to the power-assisted cart; and a control means for controlling the drive means to apply a torque to the first driving wheel substantially proportional to the external force detected by the force detector, wherein the control means corrects the torque based on the detected inclination.

19. The power-assisted cart as claimed in claim 18, wherein the control means is operable to correct the torque based on the inclination detected by the inclination detecting means by applying an additional force component to the cart, wherein the additional force component is selected to counterbalance an incline force to achieve the desired total force, wherein the incline force tends to cause the cart to descend the inclination.

20. The power-assisted cart as claimed in claim 1, further comprising a second driving wheel, wherein the first and second driving wheels are independently driven by the driving means and wherein the first driving wheel is mounted on a left portion of the wheeled platform and the second driving wheel is mounted on a right portion of the wheeled platform, and wherein a first amount of torque corresponding to the external force acting in a direction parallel to a direction of travel of the cart and a second amount of torque corresponding to an external force acting in a steering direction are applied to each of the first and second driving wheels to achieve the desired total force.

21. The power-assisted cart as claimed in claim 20, further comprising front and rear casters mounted on the wheeled platform at respective locations conforming to the direction of travel of the power-assisted cart, and wherein said driving wheels are positioned on respective left and right sides of the cart and intermediate of the length of the wheeled platform.

22. The power-assisted cart as claimed in claim 1, further comprising a clutch disposed between the drive means and the first driving wheel.

* * * * *